(12) United States Patent
Graefe et al.

(10) Patent No.: US 8,572,068 B2
(45) Date of Patent: Oct. 29, 2013

(54) EVALUATION OF SET OF REPRESENTATIVE QUERY PERFORMANCE USING ROBUSTNESS MAPPING

(75) Inventors: Goetz Graefe, Madison, WI (US); Murali M. Krishna, Vancouver, WA (US); Harumi Kuno, Cupertino, CA (US); Janet L. Wiener, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 12/364,086

(22) Filed: Feb. 2, 2009

(65) Prior Publication Data

US 2010/0198806 A1    Aug. 5, 2010

(51) Int. Cl.
*G06F 7/00*    (2006.01)
(52) U.S. Cl.
USPC ........................................................ 707/718
(58) Field of Classification Search
USPC .......................................... 707/999.003, 718
See application file for complete search history.

(56) References Cited

U.S. PATENT DOCUMENTS

| | | | |
|---|---|---|---|
| 2002/0198867 A1* | 12/2002 | Lohman et al. | 707/3 |
| 2003/0177137 A1 | 9/2003 | MacLeod et al. | |
| 2004/0044662 A1* | 3/2004 | Ganesan et al. | 707/5 |
| 2005/0222965 A1 | 10/2005 | Chaudhuri et al. | |
| 2006/0190310 A1 | 8/2006 | Gudla et al. | |
| 2006/0200451 A1 | 9/2006 | Kosuru et al. | |
| 2007/0005297 A1* | 1/2007 | Beresniewicz et al. | 702/181 |
| 2007/0143246 A1 | 6/2007 | Bestgen et al. | |
| 2009/0077013 A1* | 3/2009 | Hu et al. | 707/2 |

* cited by examiner

*Primary Examiner* — Jensen Hu

(57) ABSTRACT

Computer-implemented systems and associated operating methods use atomic query maps to identify and evaluate database query plan robustness landmarks. The computer-implemented system comprises logic that evaluates robustness of a selected atomic query by measuring performance of atomic query execution in a predetermined range of runtime conditions that include data characteristics. The logic produces a set of measurements that can be displayed as one or more performance maps and analyzes the measured performance to identify landmarks indicative of database atomic query performance degradation greater than a predetermined amount.

17 Claims, 22 Drawing Sheets

| MAP ID | LANDMARK IDENTIFIER | RESOURCE COORDINATE | DATA COORDINATE | OPERATOR | PERFORMANCE | EXPECTED PROBABILITY |
|---|---|---|---|---|---|---|
| tableScan memory input | Cliff-000 | Avg. available memory: 10-32 GB | Input size: 210 GB | Table Scan | 2300 rows/sec | Expected |
| INLJ CPU, Input Selectivity | Sinkhole-001 | Avg. CPU load: 90% | Input size: 50,000, 2500 rows; selectivity 20% | Index Nested Loops Join | 1200 rows/sec | 10% |

FIG. 4

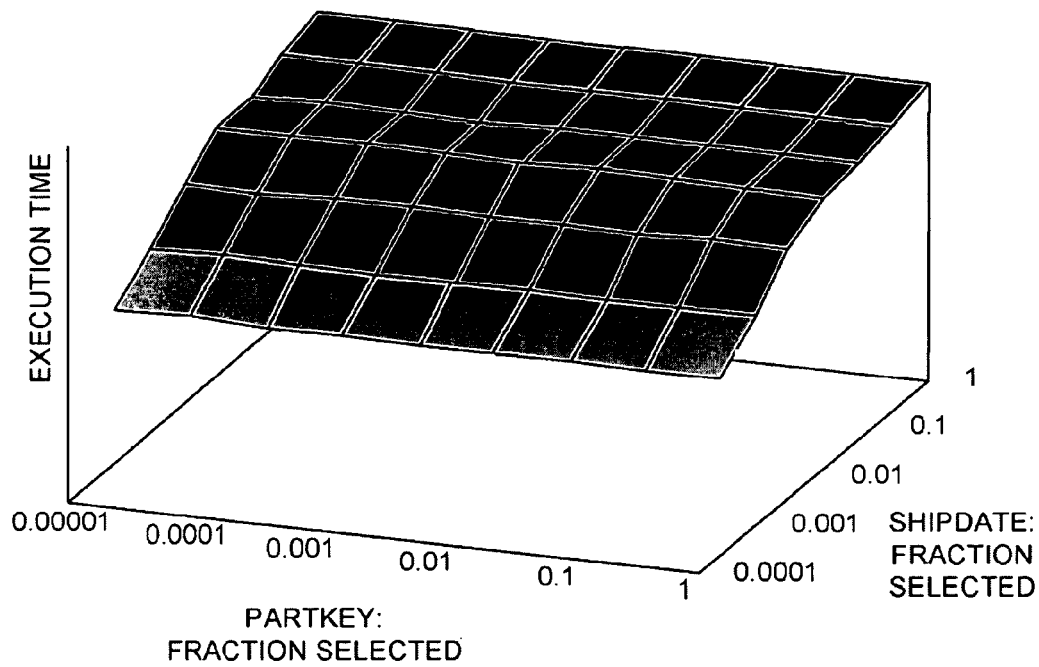
FIG. 5K(1)
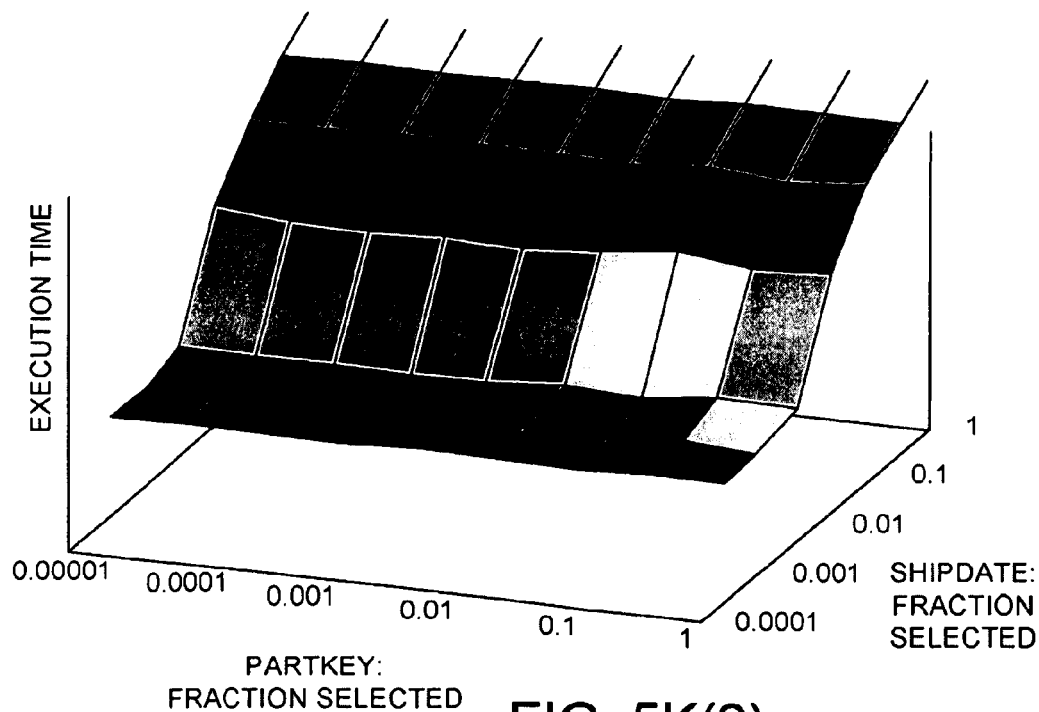
FIG. 5K(2)

EVALUATION OF SET OF REPRESENTATIVE QUERY PERFORMANCE USING ROBUSTNESS MAPPING

BACKGROUND

A query statement can be compiled into a query plan consisting of query operators. A query operator can be executed in many different ways, for example full table scans, index scans, nested loop joins, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which of plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure called a data dictionary which stores statistics used by the query optimizer. The set of available query plans that are examined is formed by examining the possible access paths, such as index scan and sequential scan, and join algorithms including sort-merge join, hash join, nested loops, and others. A search space can become very large according to complexity of the query.

Performance of a database system during processing of a query depends on the ability of a query optimizer to select an appropriate plan for executing the query under an expected set of conditions (for example, cardinality estimates, resource availability assumptions), and the ability of an executor to process the query using the selected plan under actual runtime conditions.

Some approaches to managing database system performance focus on the query optimizer's ability to select an appropriate plan. Even techniques that consider the disparity between expected and actual runtime conditions focus on assisting the query optimizer to pick the best plan with regard to such disparity.

SUMMARY

Embodiments of computer-implemented systems and associated operating methods that use atomic query maps to identify and evaluate database query plan robustness landmarks. The computer-implemented system comprises logic that evaluates robustness of a selected atomic query by measuring performance of atomic query execution in a predetermined range of runtime conditions that include data characteristics. The logic produces a set of measurements that can be displayed as one or more performance maps and analyzes the measured performance to identify landmarks indicative of database atomic query performance degradation greater than a predetermined amount.

BRIEF DESCRIPTION OF THE DRAWINGS

Embodiments of the invention relating to both structure and method of operation may best be understood by referring to the following description and accompanying drawings:

FIG. 4 is a table showing an example list of resource and data coordinates for interesting features related to a target query run on a target machine with a target plan;

FIGS. 5A through 5M are pictorial diagrams showing maps of performance under specific runtime conditions;

DETAILED DESCRIPTION

Systems are described herein which create maps of performance under a range of conditions including landmarks of interesting features using conditions as coordinates. In one embodiment, a system evaluates robustness of a given query plan by measuring performance with regard to a range of runtime conditions including resource availability and data characteristics. In other embodiments, systems evaluate robustness of a given "atomic query" by measuring performance with regard to a range of runtime conditions including resource availability and data characteristics. The set of measurements produced for the analysis can be displayed as a set of one or more maps. The system can analyze the measurements to enable identification of features on the map, which can be called landmarks, which indicate regions where performance of a given database query plan degrades less than gracefully.

In another aspect of operation, systems described herein enable identification of interesting features using conditions as coordinates. For example, a system can use the measurements attained while creating the performance maps, including coordinates of conditions under which the performance of given query plane and/or atomic query implementations may degrade in an unacceptable manner, and analyze the measurements to identify landmarks specifically relevant to a given query plan. The landmarks are areas in which the performance of the query plan is likely to degrade less than gracefully.

Figure 1:
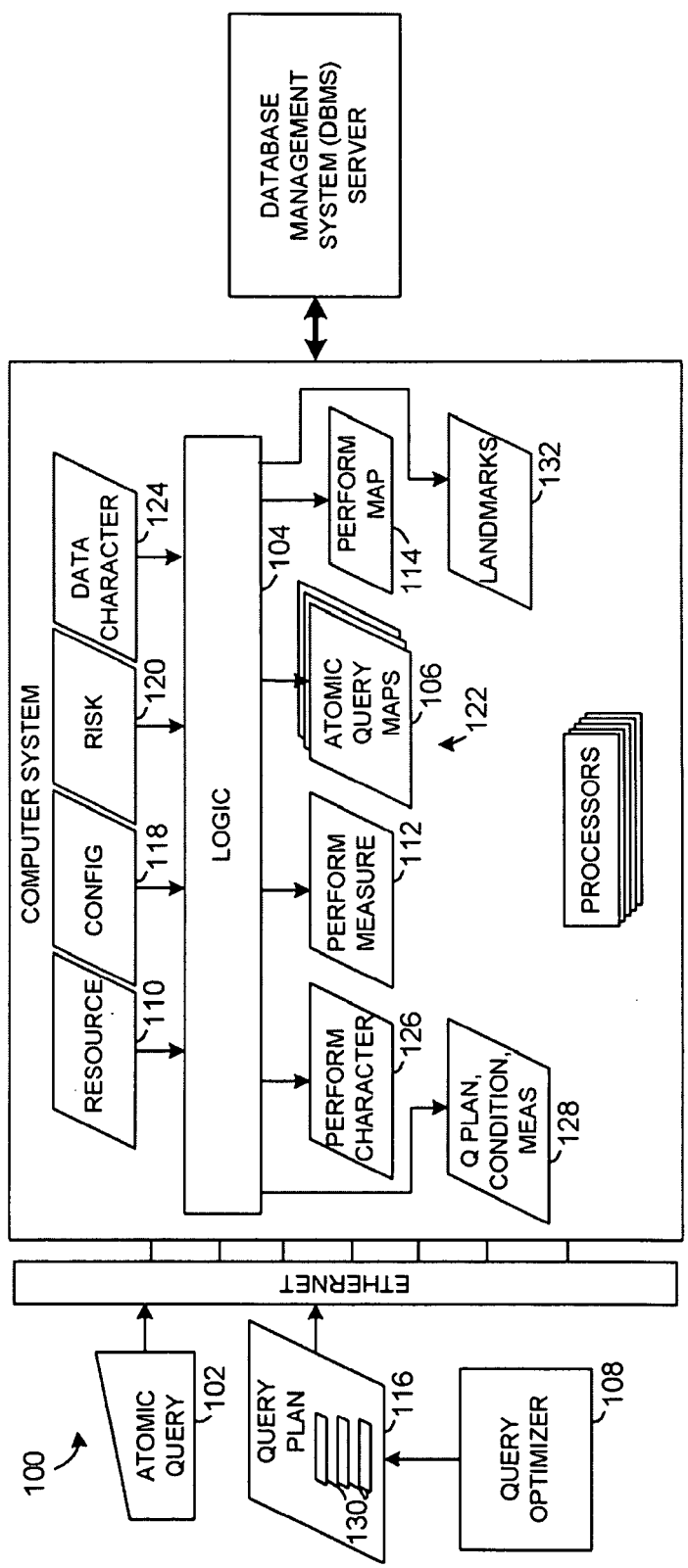
FIG. 1 is a schematic block diagram illustrating an embodiment of a computer-implemented system that uses atomic query maps to identify and evaluate database query plan robustness landmarks.

Referring to FIG. 1, a schematic block diagram illustrates an embodiment of a computer-implemented system 100 that uses atomic query maps 106 to identify and evaluate database query plan robustness landmarks. The system 100 comprise logic 104 that evaluates robustness of a selected atomic query by measuring performance of atomic query execution in a predetermined range of runtime conditions that include data characteristics. The logic 104 produces a set 112 of measurements that can be displayed as one or more performance maps 114 and analyzes the measured performance to identify landmarks indicative of database atomic query performance degradation greater than a predetermined amount.

In some embodiments, the system 100 can include an atomic query 102 to be evaluated, a set 110 of runtime resource conditions to be evaluated, and a set 124 of data characteristics. The logic 104 accesses a query plan 116 from a query optimizer 108 and executes the query 102 using the query plan 116 so that a plurality of performance characteristics 126 is measured under the conditions. The logic 104 creates a set 128 comprising the query plan, conditions, and runtime measurements.

The logic 104 can identify regions in the one or more performance maps 114 for which performance of the query plan 116 degrades more than a selected amount. The logic 104 collects the identified regions, identifies coordinates in the arrangement of the identified regions as landmarks, and creates a set 122 of atomic query maps 106 that include the identified regions and coordinates.

In some embodiments, the logic 104 accesses the set 122 of atomic query maps 106 that indicate atomic query performance in a plurality of runtime conditions, and analyzes the atomic query maps 106 to identify landmarks in relation to a selected query plan 116 wherein query performance degrades in a manner different from a predetermined manner.

In an example embodiment, the system 100 can further comprise a query plan 116, a set 118 of system configuration and contention information, and a set 120 of information that quantifies risk of encountering error in cardinality estimation during usage of database operators. The logic 104 accesses, for atomic subgraphs 130 of the query plan 116, expected conditions from the set 118 of system configuration and contention information. The logic 104 calculates data characteristics for the expected conditions and risk.

The query plan 116 and information for quantifying risk of error in cardinality estimation can be analyzed in combination since a good query plan goes together with accurate cardinality estimates. For example, cardinality estimates for single table, single column operations are usually good enough with relatively low uncertainty while cardinality estimates for multi-table and multi-column operations are often risky with high uncertainty. Risk premium-based robustness analysis recognizes the risk and uncertainty of cardinality-based cost estimates and can impose insurance risk premiums from risky operators to favor query plans that are more tolerant of cost estimation errors without unduly penalizing the runtime performance of mixed workloads of lightweight and heavyweight queries.

Risk premium-based robustness analysis can incorporate actuarial (casualty insurance) strategies into the decision-making process to mitigate risks in generated query plans. Insurance premiums can be imposed that are commensurate to the risks introduced by risky operators and plans to balance the benefits of such operators and plans against the benefits of less risky alternatives. The, the logic 104 can minimize the occurrence of catastrophically expensive query plans and improve performance predictability. The logic 104 can recognize that certain query operators such as nested join and certain query decisions such as a query's degree of parallelism are more risky than other operators and decisions.

For example, the logic 104 can select between a serial or parallel query plans based on the query's cardinality estimate. A cardinality estimate of 1000 rows may justifiably be given a serial plan, but such a serial plan is risky compared to, for example, an 8-way parallel plan. If the actual cardinality is 10 million rows, the serial plan completes in a significantly longer time in comparison to the parallel plan. In contrast, if the actual cardinality is 1000 rows or less, the 8-way parallel plan may take only marginally more time to complete than the serial plan.

"Risky operators" are query operators that are very sensitive to cardinality estimation errors. Like a good casualty insurance actuary, the logic 104 can enable a relative reward to risk analysis to significantly reduce the risks associated with optimization decisions. A risk premium can be assigned to risky operators. During plan comparison, the cost for the plan of the risky operator can be increased based on its risk premium. The logic 104 enables the query plan of the risky operator to provide a relative expected advantage over other non-risky plans, equal to or higher than the risk premium and guaranteeing that risky operators are only eliminated in situations where the expected advantage is small relative to the cost of the rest of the query. Thus, occurrence of risky query plans is significantly reduced at the expense of a small drop in the expected performance of affected queries.

The logic 104 can look up landmarks from the atomic query maps 106 in a range of conditions and cardinality specified in the set of system configuration and contention information. The logic 104 then creates a landmarks set 132 comprising landmarks and probability of complying with the conditions.

Figure 2:
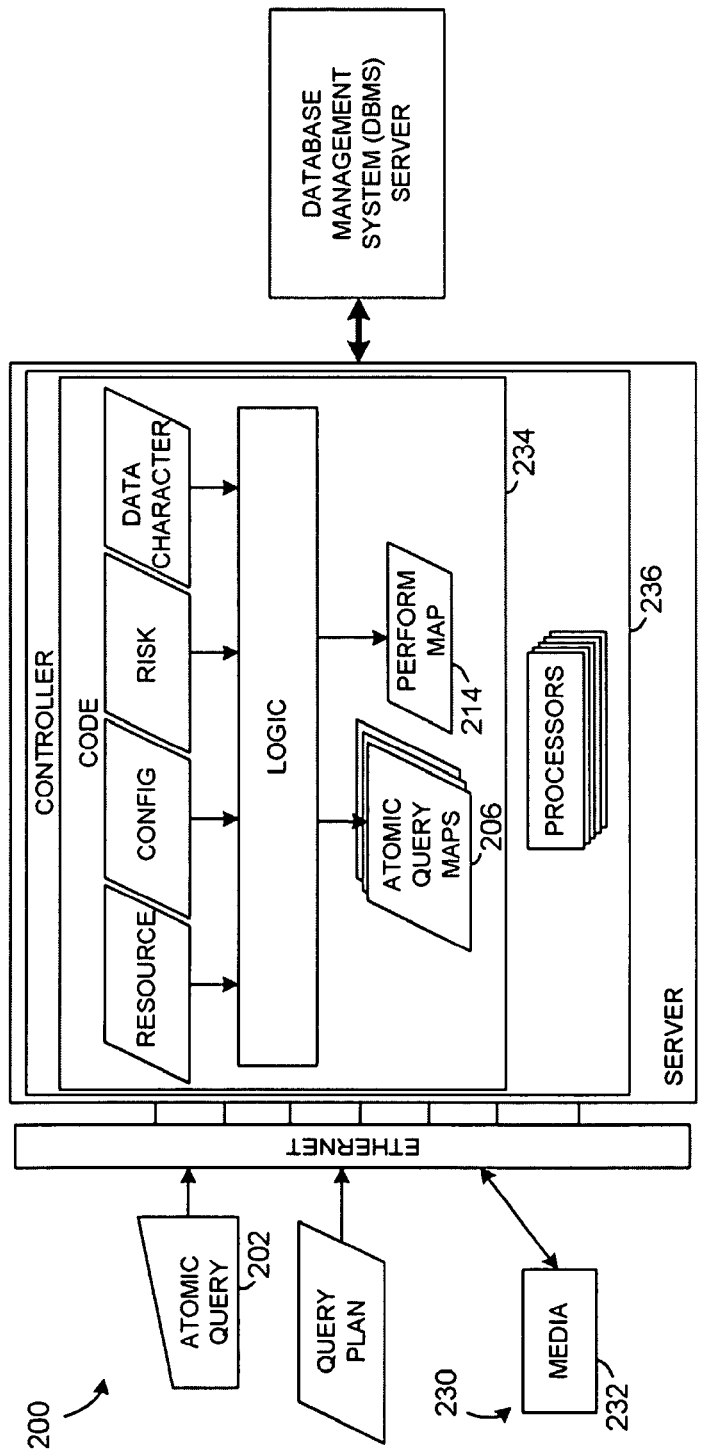
FIG. 2 is a schematic block diagram depicting an embodiment of a computer-implemented system in the form of an article of manufacture that that uses atomic query maps to identify and evaluate database query plan robustness landmarks.

Referring to FIG. 2, a schematic block diagram illustrates an embodiment of a computer-implemented system 200 in the form of an article of manufacture 230 that that uses atomic query maps 206 to identify and evaluate database query plan robustness landmarks. The article of manufacture 230 comprises a controller-usable medium 232 having a computer readable program code 234 embodied in a controller 236 for evaluating robustness of a selected atomic query 202. The computer readable program code 234 comprises code causing the controller 236 to measure performance of atomic query execution in a predetermined range of runtime conditions comprising data characteristics, and code causing the controller 236 to produce a set of measurements that can be displayed as one or more performance maps 214. The computer readable program code 234 comprises code causing the controller 236 to analyze the measured performance to identify landmarks indicative of database atomic query performance degradation greater than a selected amount.

Figure 3:
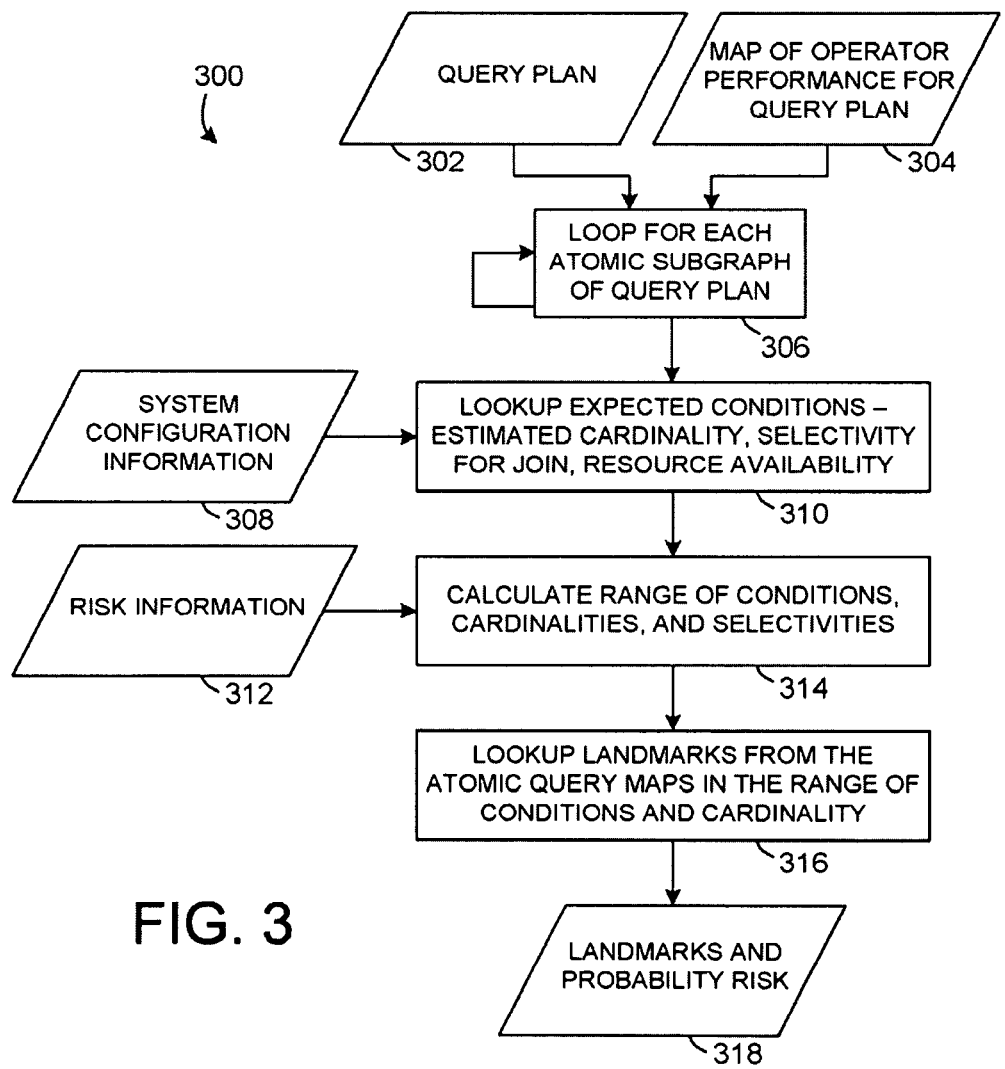
FIG. 3 is a schematic flow chart depicting an embodiment of method for using measurements produced by evaluating an atomic query performance to identify landmarks specifically relevant to a given query plan wherein the landmarks identify areas in which the performance of the query plan is likely to degrade less than gracefully.

Referring to FIG. 3, a schematic flow chart illustrates an embodiment of method for using measurements produced by evaluating an atomic query performance to identify landmarks specifically relevant to a given query plan wherein the landmarks identify areas in which the performance of the query plan is likely to degrade less than gracefully.

The flowchart exemplifies actions of an embodiment of a system that uses the maps produced by the system 100 shown in FIG. 1 (the maps including coordinates of conditions under which the performance of given operator implementations may degrade in an unacceptable manner), and analyzes the maps to identify landmarks specifically relevant to a given atomic query wherein the landmarks show conditions under which the performance of given atomic query implementations may degrade in an unacceptable manner.

Given a target query plan 302 and a set 304 of operator-specific coordinates of landmarks that associate performance conditions with ranges of resource and data conditions, the operational method 300 can begin by sequencing 306 through atomic subgraphs of the query plan. The set 304 contains coordinates of "danger zone landmarks" in terms of operator's cardinality, resource conditions, and performance maps for the atomic query components that correspond to the query plan. For each node of the query plan, the range of expected conditions (data, resource conditions) under which that node's operator is expected to run is looked up 310, then the landmarks associated with conditions for that operator are looked up and recorded. The lookup 310 of expected conditions is performed by accessing system configuration information 308 including, for example, amount of memory, CPU load, potential hardware configuration, and others. Examples of expected conditions can include estimated cardinality for various base tables, estimated selectivity for join and selection predicates, expected resource availability, and the like.

Based on the lookup 310 of expected conditions and a set 312 of information setting forth risk factors, an extended range of conditions can optionally be calculated 314 and also landmarks that fall in the landmark areas can be looked up 316 from the atomic query maps in the pertinent range of conditions and cardinality. The method 300 can further comprise recording 318 the probabilities of landmark occurrence along with coordinates and performance impact.

The illustrative system 100 and method 300 can explicitly evaluate performance under a wide variety of runtime conditions and enable a map to be used to "look up" the probable performance of a database query plan under a specific set of actual runtime conditions. The map can be analyzed to evaluate the continuity of the performance of a database query using a specific query plan under progressively adverse conditions. For example, while a traditional regression test can be used to identify points at which performance degrades, the map disclosed herein can be used to identify patterns of points at which performance degrades unnaturally. A set of maps can be used to rationalize the complex factors and interactions that determine the performance of a database system.

Referring to FIG. 4, a table shows an example list of resource and data coordinates for interesting features related to a target query run on a target machine with a target plan.

Figure 5A:
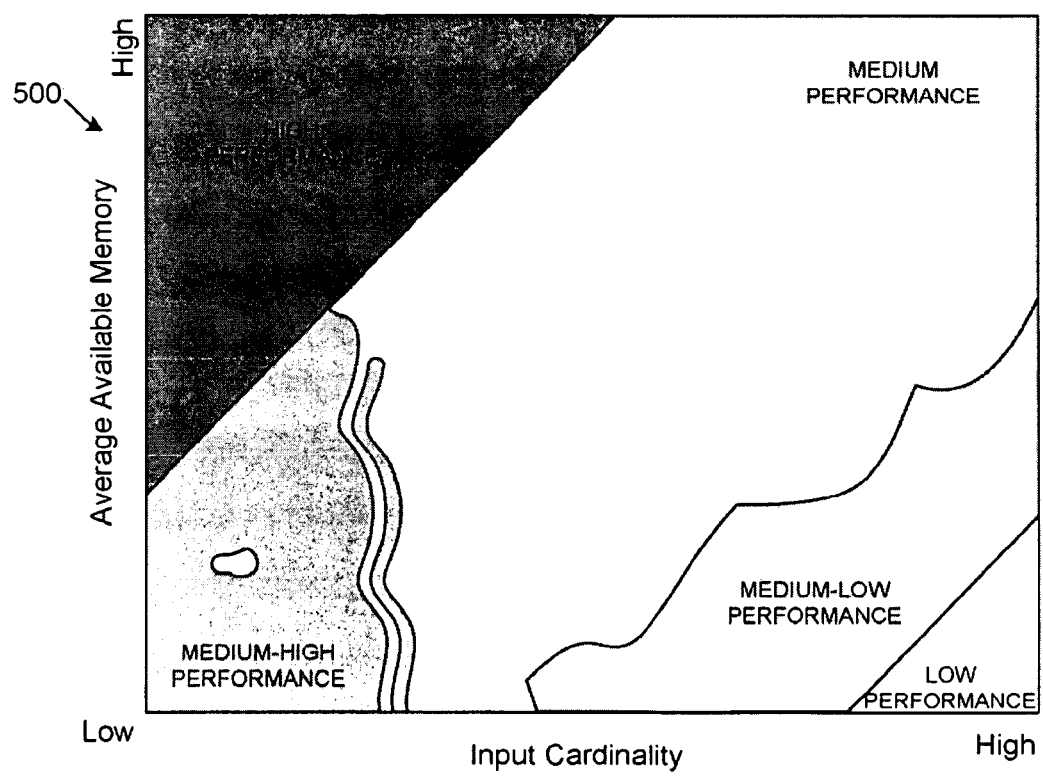

Referring to FIG. 5A, a pictorial diagram shows a hypothetical map of performance under specific runtime conditions for a database operator. In the example, FIG. 5A depicts a hypothetical map 500 of performance under specific runtime conditions for a database scan operation for one of the nodes from the target query plan. The X axis shows the number of rows of input that are processed during execution (cardinality). The Y axis represents the maximum amount of memory available to the executor for the subject query during execution. Regions of the map can be color-coded or grayscale-coded according to average throughput under their particular available memory/input tuples processed conditions. Darker colors indicate higher throughput. A similar graph can be created for conditions such as average CPU load average during the execution of the query or other parameters. Multiple graphs can be combined to show performance under multiple conditions, for example including aspects of one or more of cardinality, memory availability, CPU load average, average disk busy, and the like. A similar graph can also be created for each node in the target query plan. Any number of other visualization techniques can be applied to capture the information. In the illustrative example, a smaller rectangle marks the region of anticipated conditions under which the query is expected to execute. A larger rectangle marks a region of 10% probability.

Figure 5B:
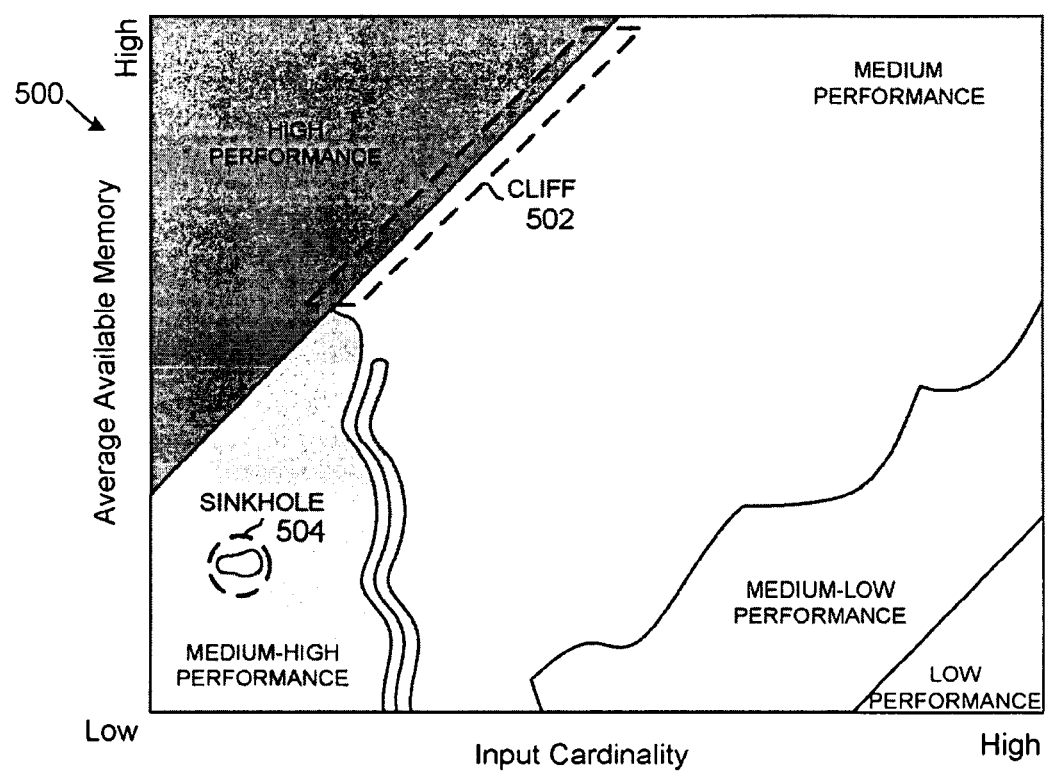

"Robustness" is defined herein as a measure of continuity of the curvature of the function describing performance under varying conditions. FIG. 5B shows how "interesting features" can be marked on the map 500. In an example application, areas of interest can be defined as areas where performance drops off precipitously. Thus, where performance does not degrade gracefully. For example, the circled area labeled "cliff" 502 shows where performance suddenly degrades when the input size of the inner input exceeds the amount of memory available. In addition, performance may be expected to be a monotonic function—for example that performance will steadily degrade as the amount of data grows and as the amount of available memory decreases. The maps can therefore also note areas where performance is not monotonic. For example, the circled area labeled "cliff" 502 notes the coordinates of an area where throughput drops off sharply. Similarly, a circled area labeled "sinkhole" 504 marks a small range of memory and input cardinality values for which throughput drops off sharply, only to resume to expected levels of throughput upon exiting the area. The robustness map 500 can accommodate any number of other types of features.

Considering that performance of a database system during processing of a query depends on the ability of a query optimizer to select an appropriate plan for executing the query under an expected set of conditions and the ability of an executor to process the query using the selected plan under actual runtime conditions, a challenge arises that actual runtime conditions can differ significantly from what is expected, particularly in situations where multiple queries execute simultaneously. For example, data skew can cause cardinality to exceed expectations by multiple orders of magnitude, or an unexpectedly heavyweight query can monopolize memory, leaving only a fraction of expected memory available. In a worst case, actual runtime conditions can be so adverse that the selected query plan can potentially be the worst, as opposed to the best, plan for the given conditions.

In addition, database operator implementations are typically tested to verify performance at specific points, as opposed to tested in terms of the continuity of performance degradation over a large range of conditions. Thus, performance can suddenly degrade dramatically and unexpectedly with only a minor change in conditions. Accordingly, the system 100 depicted in FIG. 1 and associated functionality, by creating a map of performance under a large range of conditions, enables the prediction and analysis of such performance degradation.

In another aspect of operation, the operator map can be used to identify and evaluate database query plan robustness landmarks.

Accordingly, a system and associated method use the created maps of coordinates of conditions under which the performance of given operator implementations may degrade in an unacceptable manner, and analyze the map to identify landmarks specifically relevant to a given query plan, wherein the landmarks are defined as areas in which the performance of the query's performance is likely to degrade less than gracefully.

The system can create a map that evaluates landmarks specifically relevant to a given query plan with regard to a variety of conditions including resource availability and data characteristics.

A goal of the systems depicted herein that create and use robustness maps is to enable measurement and comparison of how gracefully a database system's query architecture, operators, and implementation degrade during adverse conditions. Thus, several kinds of diagrams that we call robustness maps can be created that quantify and visualize how performance degrades as work increases or as resources decrease. Robustness maps permit reasoning about the executor's impact on query robustness. For example, robustness maps can inform regression testing as well as motivate, track, and protect improvements in query execution.

Figure 5C:
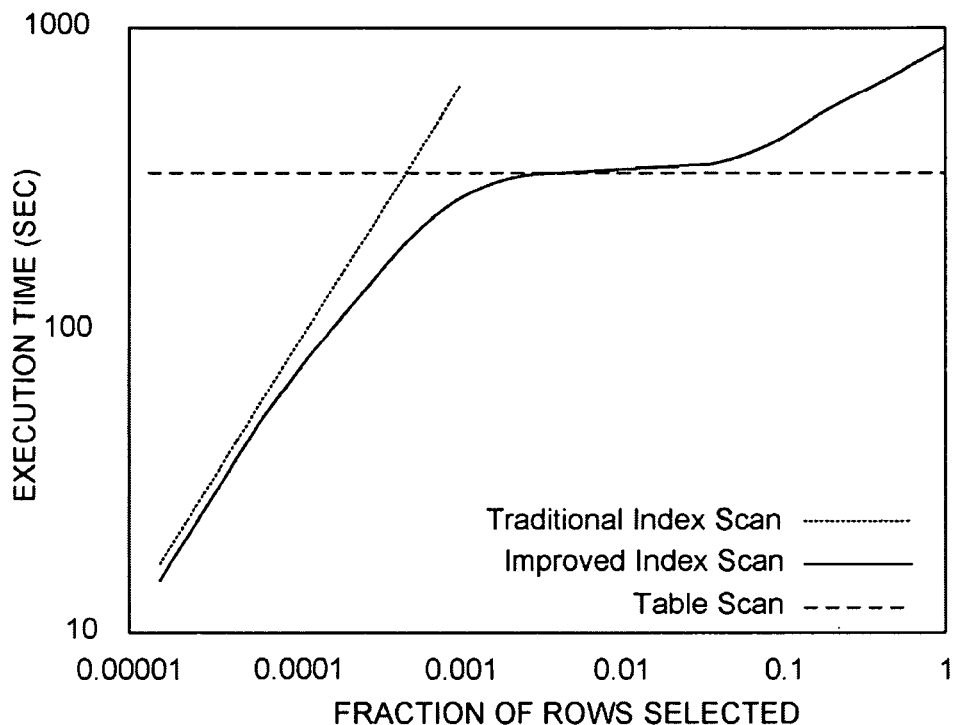

Referring to FIG. 5C, a diagram illustrates an example of a two-dimensional parameter space robustness table with single-table, single-predicate selection and shows execution times for selecting rows from a table (Transaction Processing Performance Council (TPC-H) benchmark line items, about 60M rows) for a variety of selectivities (result sizes). Selectivities and execution times both are shown with logarithmic scales. Query result sizes differ by a factor of two between data points. FIG. 5C shows performance of three query execution planes. One plan is a traditional table scan with performance constant across the entire range of selectivities. For small result sizes, the table scan is unacceptably slow compared to the index scans. A second plan is a traditional index scan, which is unacceptably slow for moderate and large result sizes due to the need to fetch qualifying rows from the table. Cost of the index scan is so high that showing the entire range of selectivities is not possible. The break-even point between table scan and traditional index scan is at about 30K result rows or $2^{-11}$ of the rows in the table. A third plan is an improved index scan which combines low latency for small results as well as high bandwidth for moderate result sizes. The cost of the improved index scan remains competitive with the table scan all the way up to about 4M result rows or $2^{-4}$ of the rows in the table. However, the improved index scan, despite improvement over the traditional index scan, has performance that is poor for large results. If all rows in the table satisfy the query predicate, the performance of the improved index scan is about 2½ times worse than a table scan. While a factor of 2½ is undesirable, cost is much less than cost of a traditional index scan which would exceed the cost of a table scan by multiple orders of magnitude.

An optimistic insight from FIG. 5C is that robust execution seems possible. A pessimistic insight is that the improved index scan as implemented in the system is not yet sufficiently robust. One perspective view is that a single query execution plan might eventually be superior or at least competitive across the entire range so that an erroneous choice during compile-time query optimization can be avoided by eliminating selection among alternatives. Another perspective view is that the query execution engine has not yet reached a sufficient level of sophistication and robustness. Considering the simple techniques that underlie the "improved" plan in FIG. 5C, appropriate run-time techniques can be used based on the usage of robustness maps analysis.

Although FIG. 5C can enable observations, insights, and perspective on a research effort, other visualizations enable additional insights into additional aspects of robustness and are helpful for individual operations such as index scans and for plan fragments such as scans of multiple indexes combined by index intersection. Visual images greatly assist in identifying poor scalability or robustness, discontinuities in actual execution costs, and the like. Thus, the further visualizations help in analyzing and reasoning about query execution algorithms, implementations, entire query execution plans or fragments thereof, and the query execution architecture.

The visualizations can be employed by database software vendors to target improvements in query execution, indexing techniques, and query optimization. The visualizations can be used by database administrators to analyze specific query execution plans to address unsatisfactory performance or robustness of query execution. Various visualizations have been found particularly helpful and are disclosed herein.

FIG. 5C is an example of a simple visualization of performance and robustness. One aspect of performance that can be verified by the two-dimensional diagram is that the actual execution cost is monotonic across the parameter space. For example, fetching of rows is expected to become more expensive with additional rows. If cases exist in which fetching more rows is cheaper than fetching fewer rows, some aspect of performance is anomalous. For example, the governing policy or some implementation mechanisms might be faulty in the algorithms that switch to pre-fetching large pages instead of fetching individual pages as needed. Moreover, the cost curve is expected to flatten, wherein the first derivative of the cost curve should monotonically decrease. Fetching more rows should cost more, but the difference between fetching 100 and 200 rows should not be greater than between fetching 1,000 and 1,100 rows, a condition that is not true for the improved index scan shown in FIG. 5C since the curve for the improved index scan shows a flat cost growth followed by a steeper cost growth for very large result sizes.

Figure 5D:
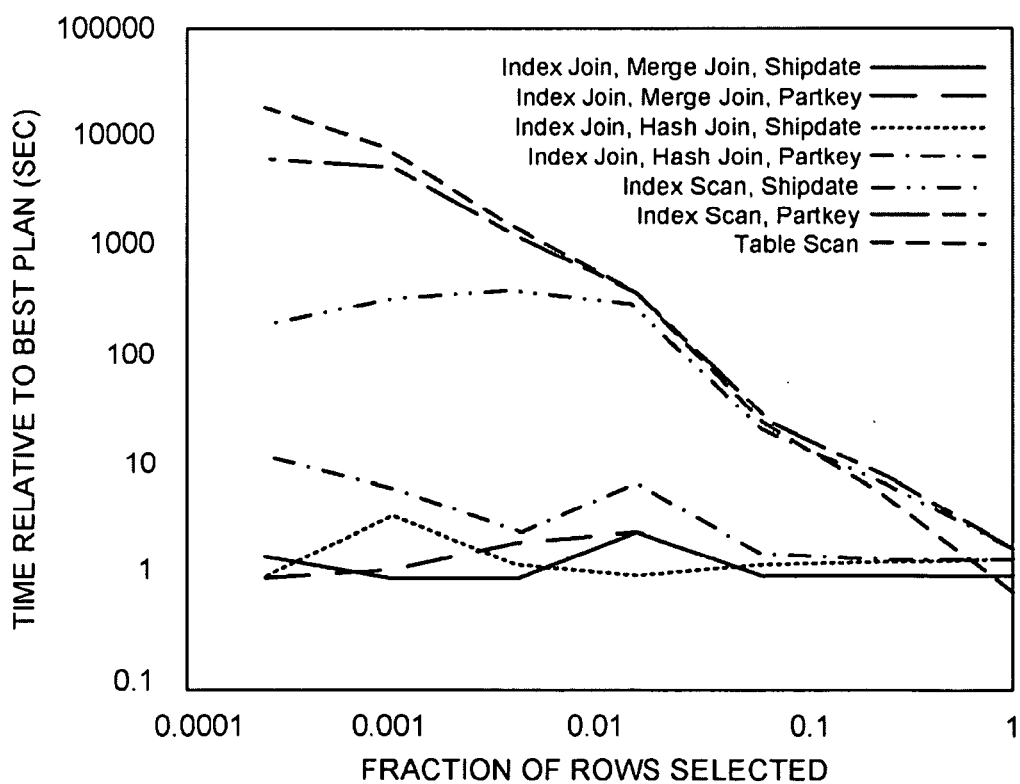

FIG. 5D is a diagram showing performance of plans for a simple query similar to the query of FIG. 5C, with two differences. First, performance is shown not in absolute times but relative to the best plan for each point in the parameter space. This type of diagram is most appropriate if the absolute performance varies very widely across the parameter space. In FIG. 5C for example, the left-most data point still represents an output size of about 900 rows ($60M \times 2^{-16}$). Even with a logarithmic scale for query execution costs, extending the diagram all the way to one output row would increase diagram height or reduce vertical resolution by a factor of 2½. Illustrating the relative performance of all plans may permit better resolution and better use of the space available for a diagram. Second, additional query execution plans are included, specifically multi-index plans that join non-clustered indexes such that the join result covers the query even if no single non-clustered index does. These index joins are performed by alternative join algorithms and using alternative join orders.

When comparing query execution plans for a given query, analysis includes determination of which classes of query execution plans to include such as: (1) only plans actually considered by the system under investigation; (2) plans that could be forced by some means or other including alternative syntax (for example, index intersection by means of multiple query aliases for the same database table); (3) plans that could be enabled only by an alternative database design (such as two-column indexes); or (4) plans that could be realized only with additional implementation effort by the software vendor (such as bitmap indexes, bitmap-driven sorting or intersection). Actual execution costs for the fourth class might be obtained through experiments using a competing database system that is more advanced in specific query execution techniques. The most appropriate class choice depends on whether design and future improvements of system components can be selected. For example, plans enabled by alternative syntax can considered if influence over the rewrite capabilities in the query optimization steps is available.

The diagrams can be implemented using either linear or logarithmic scales. Logarithmic scales on both axes permit reasonably detailed insight at both ends of the spectrum of possible parameter values. Curves can be formed to indicate absolute performance or performance relative to the best plan for any one point in the parameter space, where the definition for "best" might include any of the classes of query execution plans.

Robustness maps can also display performance in three-dimensional parameter spaces. Limitation to a single dimension within the parameter space both focuses and limits the insights. The interaction of dimensions can also be considered. The number of possible parameters may be very high, including multiple formal query parameters with run-time bindings; resource availability such as memory, processing bandwidth, I/O bandwidth, and interconnection bandwidth; and intermediate result sizes due to predicates (selection, joins), aggregation (projection, duplicate removal), and set operations (intersection, union, difference). Visualization practically forces consideration of two dimensions at a time and rotation through pairs of dimensions.

Figure 5E:
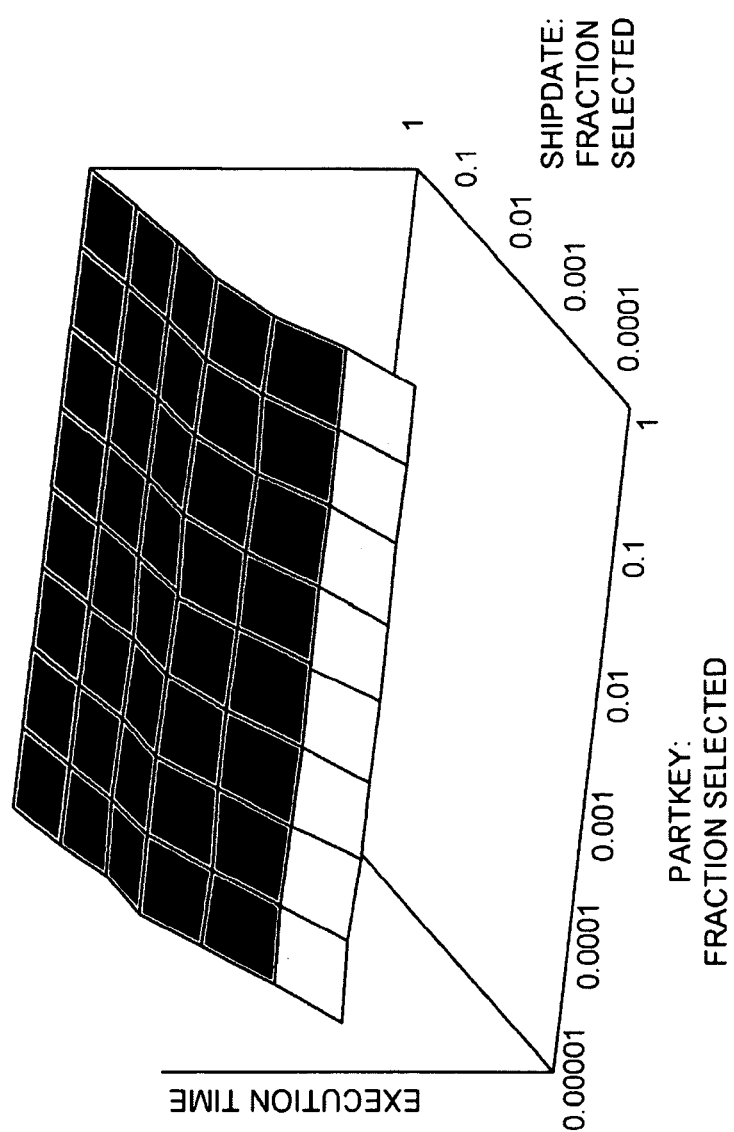

Referring to FIG. 5E, a three-dimensional map is shown which displays a parameter, illustratively execution time, in grayscale-coding or color-coding. The mapping shows elapsed times in colors or monochrome shades from green to red and finally black (light gray to black in monochrome) with each color or shade difference indicating an order of magnitude. FIG. 5E illustrates two-predicate, single-index selection, showing the execution cost for a query restricting two columns of a table. The query execution plan scans a single-column index and applies the second predicate only after fetching entire rows from the table's main storage structure. The two dimensions shown are the selectivities of the two predicate clauses. The third dimension is execution time, ranging from 4 seconds to 890 seconds.

As shown in FIG. 5E, the two dimensions have very different effects. In fact, one of the predicates appears to have practically no effect at all wherein the predicate can be evaluated only after fetching entire rows—a result which is predictable because index scans perform as expected and as coded in the cost calculations during query optimization. The actual behavior meets the anticipated behavior (reflected correctly in the cost function used during query optimization). FIG. 5E shows the robust query execution technology from FIG. 5C. While barely visible in FIG. 5E, FIG. 5C illustrates robustness very succinctly, demonstrating the value of visualizations using a combination of one-dimensional and two-dimensional parameter spaces.

Figure 5F:
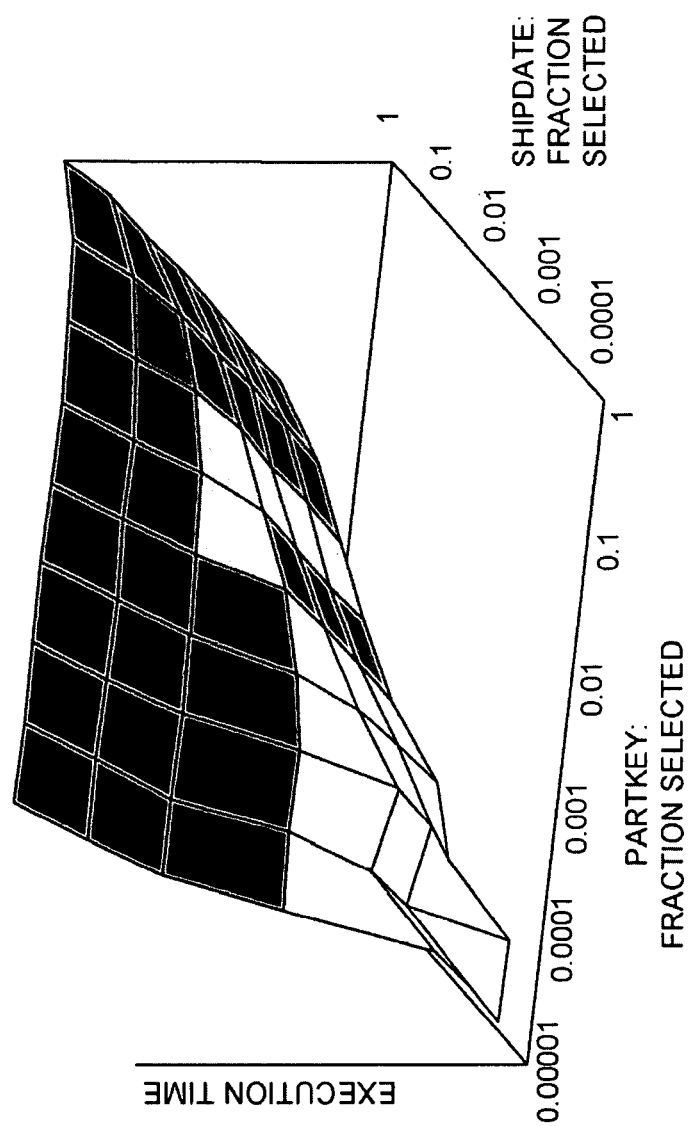

Referring to FIG. 5F, a three-dimensional diagram illustrates operation of a two-index merge join, and shows the execution cost for an alternative query execution plan, specifically scans of two single-column non-clustered indexes combined by a merge join. Other than some measurement flukes in the sub-second range (front left, green), the symmetry in the diagram indicates that the two dimensions have very similar effects. Hash join plans perform better in some cases but do not exhibit symmetry.

Figure 5G:
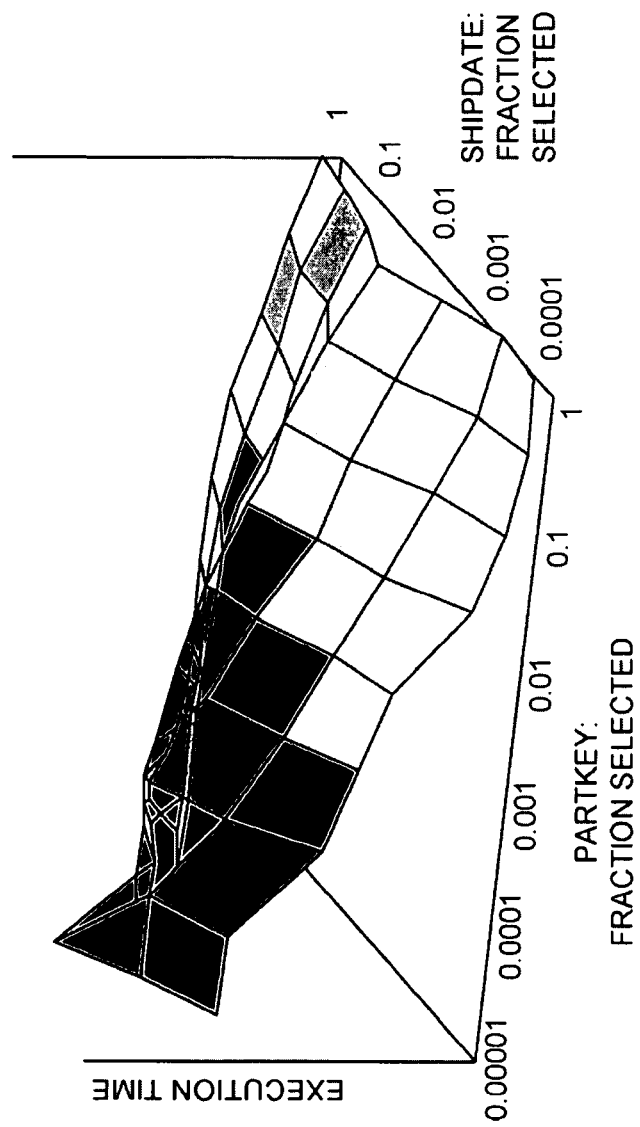

In addition to the two plans depicted in FIGS. 5E and 5F, FIG. 5G illustrates a map acquired by running five additional alternative query execution plans for the simple query. The query execution plans include a no-index table scan (actually, scanning a clustered index organized on an entirely unrelated column), a plan using a single-column non-clustered index for the other predicate clause, and three other plans combining two single-column non-clustered indexes (using merge join or hash join each in two join orders). The relative performance of each individual plan is plotted compared to the optimal plan at each point in the parameter space. A given plan is optimal if performance is equal to the optimal performance among all plans, so that the quotient of costs is 1. A plan is sub-optimal if the quotient is much higher than 1.

Referring to FIG. 5G, a three-dimensional diagram depicts performance of a single-index can relative to the best of seven plans. FIG. 5G shows the same data as FIG. 5E with performance indicated in terms of the relative difference to the best plan at each point. The diagram enables immediate recognition that the plan is optimal only in a small part of the parameter space. Moreover, the region is not continuous. While the absolute performance shown in FIG. 5E is fairly smooth, the relative performance shown in FIG. 5G is not smooth indicating that the costs of best plans are not smooth. In the example, the maximal difference is a factor of 101,000. Thus, while the plan is optimal in some regions of the parameter space, the worst relative performance is so poor that disruption of data center operation is likely.

Figure 5H:
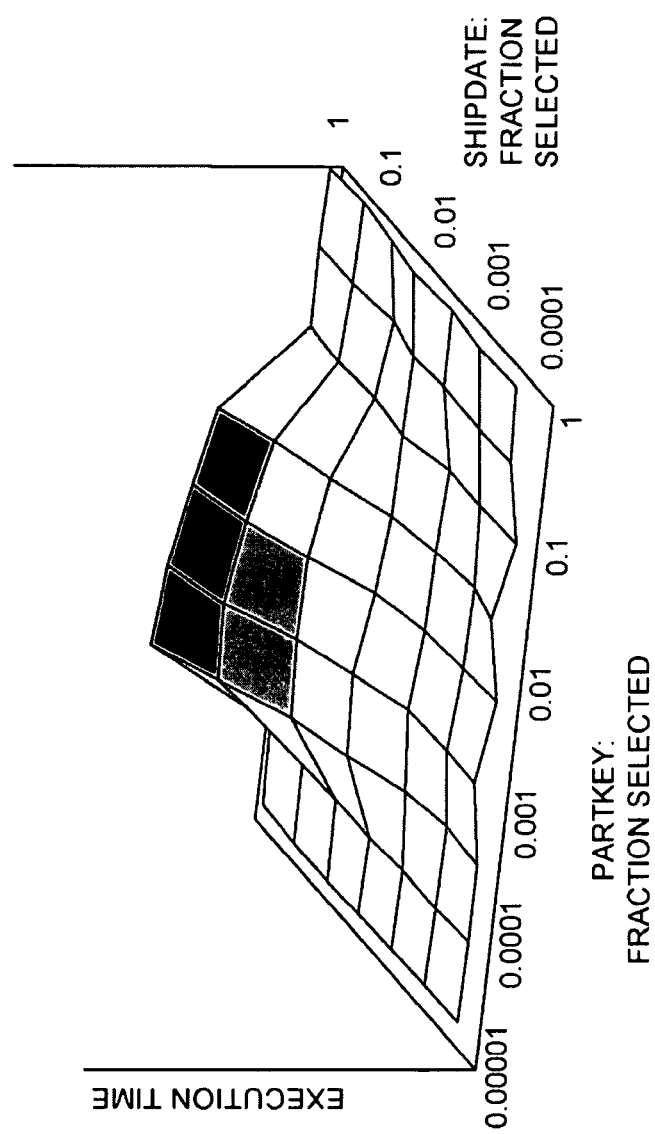

Referring to FIG. 5H, a three-dimensional diagram illustrates relative performance of a system using a two-column index, depicting the relative performance of a plan with a covering two-column index in an a software system different from that analyzed with respect to FIG. 5G. Due to multi-version concurrency control applied only to rows in the main table, the plan involves fetching full rows. In other words, the space overhead of multi-version concurrency control seems to have forced the developers of the system to apply concurrency control only to rows in the main representation of the table. Thus, the advantages of covering non-clustered indexes, including joins of multiple non-clustered indexes are disabled.

In the query execution plan, rows to be fetched are sorted very efficiently using a bitmap. The plan is close to optimal in this system over a much larger region of the parameter space. Moreover, the plan's worst quotient is not as bad as that of the prior plan shown in FIG. 5G. Thus, if the actual value of parameters is not known at compile-time, the plan is probably much more desirable even if the plans of FIG. 5E and FIG. 5F are judged more efficient at compile-time based on anticipated predicate selectivities. Thus, robustness might well trump performance in those situations.

Figure 5I:
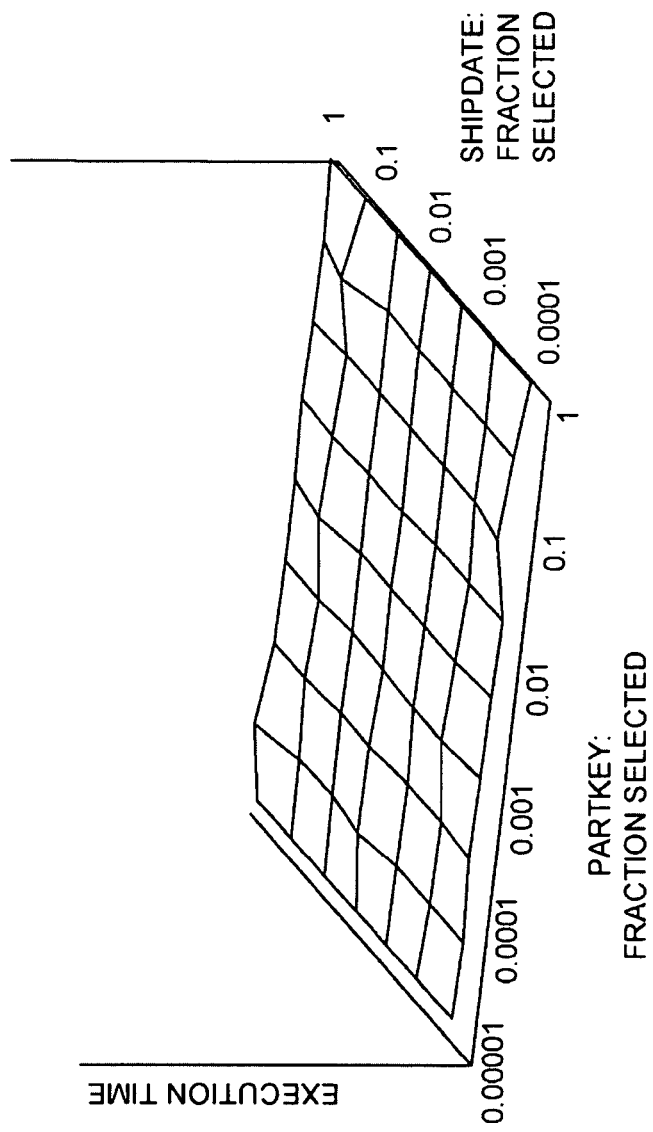

Referring to FIG. 5I, a three-dimensional robustness map shows the most robust plan in a third system. Relative performance is good across the entire parameter space, albeit not optimal. The foundation of consistent performance is a sophisticated scan for multi-column indexes described as multi-dimensional B-tree access. Data points indicate that the plan is the best query execution plan (indicated by a cost factor 1 or a light green color or light monochrome shade).

The visualization techniques employed to form the diagrams enable rapid verification of expected performance, testing of hypotheses, and insight into absolute and relative performance of alternative query execution plans. For even a very simple query, a plethora of query execution plans can be used. Investigating many plans over a parameter space with multiple dimensions is possible only with efficient visualizations.

Other robustness maps can be created to analyze other aspects of performance. For example, worst performance can be mapped to detect particularly dangerous plans and relative performance of plans compared to worst possible performance. In addition, multiple systems and available plans can be compared in combination.

Other software development activities can be performed on the basis of the visualizations. For example, a developer can focus on improving the performance of the best plan at some points deemed important within the parameter space—a traditional focus on achievable performance. Also, a developer can focus on performance of the plan with the broadest region of acceptable performance and then improve performance in the regions of the parameter space where the plan's performance is poor—a focus on robustness of a specific plan and, if that plan is chosen during query optimization, on robustness of query processing as a whole.

Another robustness map visualization is a single map showing all possible query execution plans, indicating the best plan for each point and region in the parameter space, perhaps using a color for each plan. One aspect of the map can be the size and the shape of each plan's optimality region. The regions can be continuous, simple shapes.

For query execution, analysis can focus on irregular shapes of optimality regions. Often, some implementation idiosyncrasy rather than the algorithm can cause the irregular shape. Removal of such idiosyncrasies may lead to more efficient as well as more robust query execution.

Some techniques can enlarge the largest region, possibly even eliminating some smaller regions and thus some plans from the map of optimality. Every plan eliminated from the map implies that query analysis need not consider the eliminated plan. Reducing the plan space in query analysis contributes to the robustness.

Figure 5J:
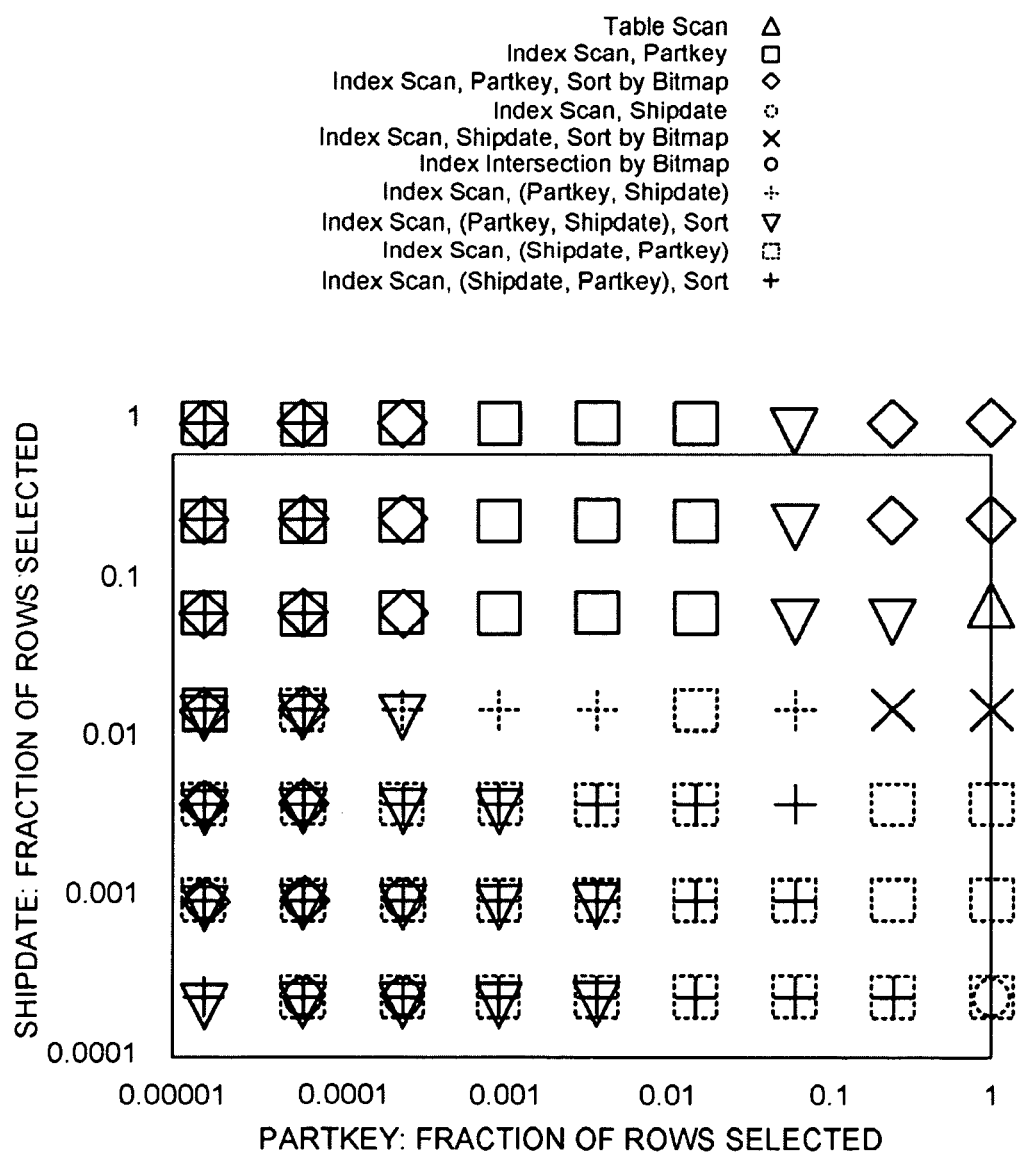

Referring to FIG. 5J, a diagram, shows mapping of regions of optimality. Most points in the parameter space have multiple optimal plans (within 0.1 sec measurement error). In fact, when analyzing optimality, all small differences should be neglected. For example, two plans with actual execution costs within 1% of each other are practically equivalent. Whether the tolerance ends at 1% difference, at 20% difference, or at a factor of 2 depends on a tradeoff between performance and robustness, and thus the tradeoff between the expense of system resources and the expense of human effort for tuning and problem resolution.

Variants of FIG. 5H and FIG. 5I can be used to show the region of optimality for a specific plan. Since the number of plans that may cover any one point in the parameter space is large, shading using two colors is typically not sufficient, but a diagram with points shaded in a large number of colors seems more confusing than illuminating. Thus, this type of diagram inherently requires one diagram per plan and thus many diagrams.

FIGS. 5K(1) and 5K(2) illustrate robustness maps for two-predicate index scan implementations. Robustness maps are designed to quantify and visualize how performance degrades as work increases and resources decrease. A plan or operator under test is fixed and performance is measured while forcing execution across a spectrum of conditions with results then plotted in a Euclidean space. The resulting shape illustrates performance degradation patterns. Slope indicates how quickly performance degrades, while curvature indicates how predictably performance degrades. Areas where the rate of performance rapidly and unpredictably drops are manifest. For example, FIGS. 5K(1) and 5K(2) compare three-dimensional robustness maps for two different implementations of a given operator, charting performance of an index scan while varying the selectivity of two predicates. Other robustness maps can be used to show how a given plan's performance compares to that of the best plan. Although only two- and three-dimensional maps are depicted herein, the technique can be used with any metric space.

Robustness maps enable analysis and reasoning about the executor's impact on query robustness. By making visible where and how performance changes, the maps show developers and regression testers the circumstances under which performance is particularly sensitive to small deviations from expected conditions. Developers can then address this sensitivity. Robustness maps thus enable a different view of performance than tests that focus on pure execution time or throughput. Robustness maps enable motivation, tracking, and protection of improvements in query execution by providing a concrete and intuitive "big picture" of the performance landscape.

The robustness map approach can be tested by building robustness maps for simple queries from the TPC-H benchmark. All database instances can be loaded with the same line item table, using the same rows (in the same order). A scale factor 10 instance of TPC-H can be used resulting, for example, in 60M rows (6 GB). In an example analysis, five indexes are built upon the table including a default clustered index on the primary key, two single column indexes on the query predicate columns, and a pair of two-column indexes on the query predicate columns. A selected number of maps are constructed and analyzed for the three systems. For example, FIGS. 5K(1,2) show that one implementation of index nested loops join is more resilient than another to variance in input data sizes, a graceful degradation that may result from the first implementation's efficient sort operation.

Figure 5L:
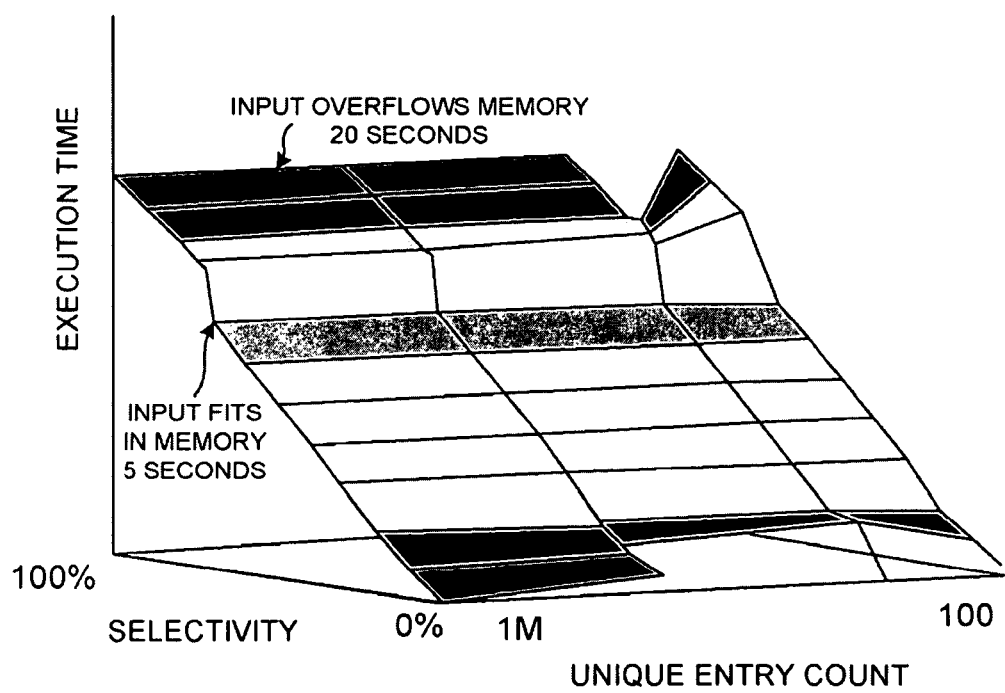

Thus robustness maps can be used to evaluate the robustness of the commercial system B sort operator. FIG. 5L shows a three-dimensional robustness map comparing the relative performance of the sort operator while varying selectivity and duplicate values. A dramatic drop in performance occurs when the data input no longer fits in memory. If estimated selectivity were one row short of the amount that would fit into memory, and the actual data size only two rows more, the sort operation would take nearly five times longer than expected.

Figure 5M:
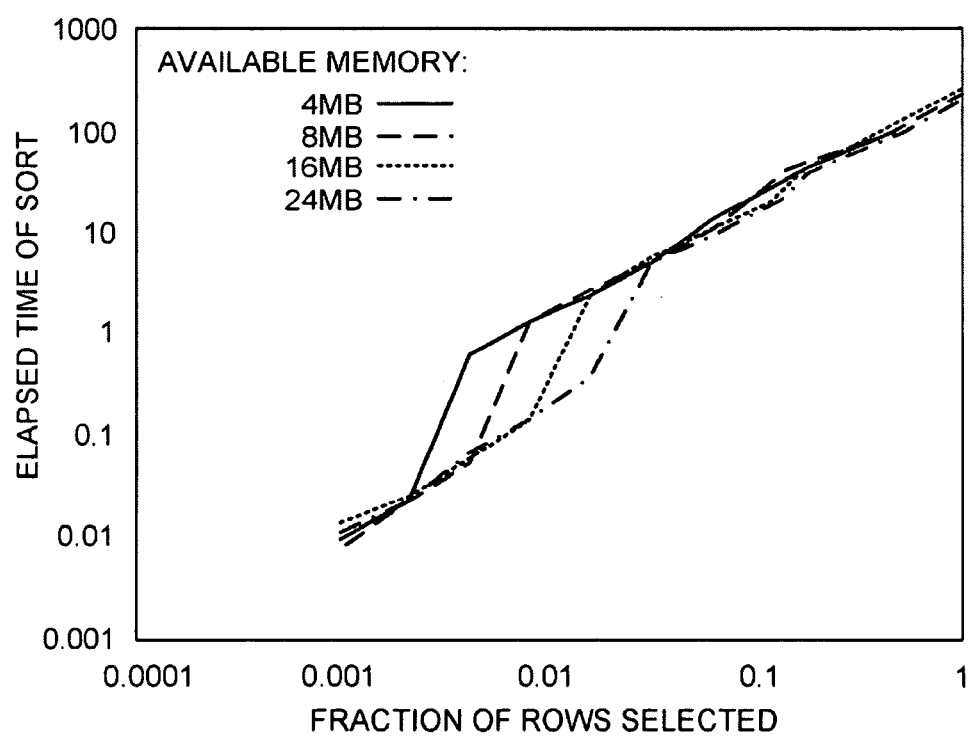

Although such a performance drop or cliff could be considered easily anticipated, since memory availability and cardinality estimates can be checked at compile-time, when the plan is selected. However, a query optimizer bases cost estimates for a sort operation on the amount of configured memory and initial cardinality estimates, both of which are subject to significant change from compile time to run-time. Resource contention can reduce the amount of available memory to a small fraction of that anticipated. Multiple levels of intermediate results can compound that impact. FIG. 5M maps how performance degrades as available memory decreases and shows how memory contention changes the location of the critical point where a small increase in data size causes a major drop in performance.

Run-time performance of any query plan can vary dramatically depending on execution conditions such as actual predicate selectivity and contention for memory and other resources. Execution conditions vary unpredictably, leading to the unexpectedly long-running queries that plague database users and administrators today. Thus, robust query processing reduces cost of ownership by reducing the need for human intervention.

In general, robustness in database query processing can be improved by modifications in query optimization, query execution, workload management, and other components. The systems and techniques disclosed herein focus on query execution. Robustness maps can be used to visualize performance of query execution algorithms and plan fragments, enabling understanding of behavior across a wide range of unexpected situations.

Various visualization techniques reveal different insights. Robustness maps with two- and three-dimensional parameter spaces are introduced, including discussion of robustness map interpretation, a demonstration of how to detect landmarks that appear on the maps, and a discussion of implications for robustness.

Visualizing the performance of specific algorithms, associated implementations, and plan fragments using the algorithms enables analysis of strengths and weaknesses. Adaptive techniques during run-time query execution can have as great an impact on robust query processing as plan choices during compile-time query optimization. Adaptive run-time techniques pertain to data volumes, resource availability including memory, and the specifics of the memory hierarchy.

Robustness map analysis and its visualization can be extended to additional query execution algorithms including sort, aggregation, join algorithms, and join order. For example, some implementations of sorting spill their entire input to disk if the input size exceeds the memory size by merely a single record. Those sort implementations lacking graceful degradation will show discontinuous execution costs. Other resources may introduce similar effect, such as a sort input exceeding the size of the CPU cache or the size of flash memory.

Robustness maps enable visualizations of entire query execution plans including parallel plans. A benchmark can be defined that focuses on robustness of query execution and, more generally, of query processing. The benchmark can be used to identify weaknesses in the algorithms and implementations, track progress against weaknesses, and permit daily regression testing to protect the progress against accidental regression due to other, seemingly unrelated, software changes.

Various approaches to managing database system performance can be based on the query optimizer's ability to select an appropriate plan. Even techniques that consider the disparity between expected and actual runtime conditions focus on assisting the query optimizer to pick the best plan with regard to such disparity. In contrast, an illustrative system 600 shown in FIG. 6 takes the maps produced by the system 100 shown in FIG. 1 which map coordinates of conditions under which the performance of given atomic query implementations may degrade in an unacceptable manner, and analyzes the maps to identify landmarks specifically relevant to a given query plan. The landmarks specify areas in which the performance of the query plan is likely to degrade less than gracefully.

Figure 6:
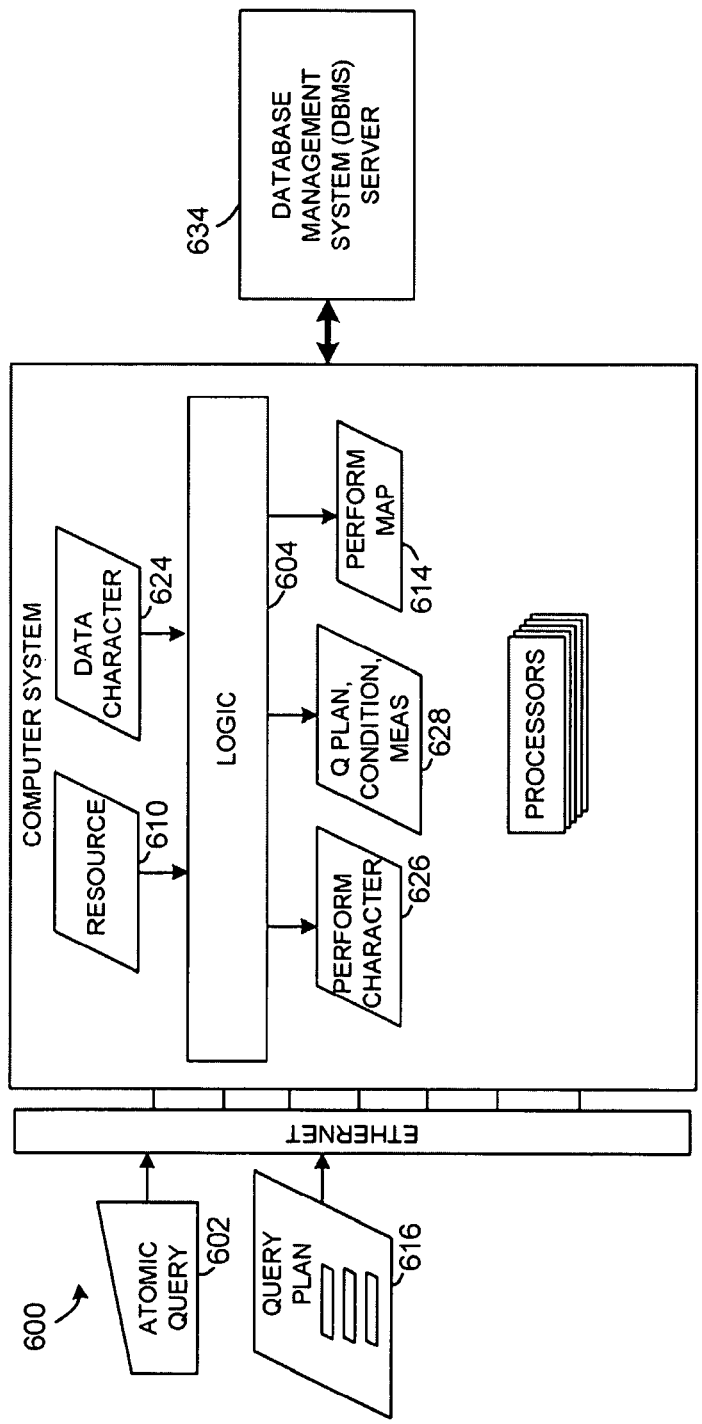
FIG. 6 is a schematic block diagram depicting an embodiment of a computer-implemented system that evaluates robustness of a given query plan by measuring performance with regard to a range of runtime conditions such as resource availability and data characteristics.

Referring to FIG. 6, a schematic block diagram depicts an embodiment of a computer-implemented system 600 that evaluates robustness of a given query plan by measuring performance with regard to a range of runtime conditions such as resource availability and data characteristics. The system 600 also produces a set of measurements that can be displayed as a set of one or more maps. The system 600 can further be extended to analyze the measurements to identify landmarks—features on the map indicating regions where performance of a given database query plan degrades less than gracefully.

The computer-implemented system 600 comprises logic 604 that evaluates database performance of a selected query plan 616. The logic 604 creates a set of performance maps 614 indicating performance of a selected database system 634 following the selected query plan 616 under actual conditions. The logic 604 measures and maps performance in a predetermined range of runtime conditions that include data characteristics.

The system 600 can further comprise a target query plan 616 to be evaluated, a set 610 of runtime resource conditions to be evaluated, and a set 624 of data characteristics. The logic 604 executes a query 602 using the target query plan 616 and measures a plurality of performance characteristics 626 for selected runtime resource conditions at a plurality of data characteristics. The logic 604 creates a set 628 comprising the query plan, conditions, and performance measurements.

In some embodiments, the logic 604 can identify regions in one or more performance maps 614 for which performance of the query plan 616 degrades more than a selected amount. The logic 604 collects the identified regions, identifies coordinates in the arrangement of the identified regions as landmarks, and creates a performance map 614 of query plan performance that includes landmark coordinates in terms of cardinality, resource conditions, and performance of the target query plan.

In contrast to the illustrative systems 100 and 600, traditional solutions do not consider the impact of variable runtime conditions, such as resource availability, and do not systematically gather actual performance measurements over a variety of runtime conditions. Furthermore, traditional solutions focus on the selection of optimal query plans for a small range expected conditions, as opposed to the evaluation of database operators under a wide variety of actual conditions.

For example, Harista et al. (U.S. Publication No. 2002/0046030) discloses a system that maps how well queries perform relative to one another in terms of estimated (expected) performance in ranges of the selectivity of a simple single-operator query with up to two parameters. Because the goal in Harista et al. is to reduce the number of plans in the query optimizer's plan search space, actual performance is not modeled and the impact of other conditions such as resource availability is not considered.

Database regression tests may test the performance of individual operators, sometimes under specific resource availability conditions, but do not evaluate performance across a spectrum of conditions and do not consider performance as a continuous function across a spectrum of conditions. Database regression tests are used to evaluate performance—results are not stored nor later used to calculate an estimate for a specific query's performance under specific conditions.

Database physical design advisors evaluate physical design search spaces, often with regard to specific query plans or atomic query plans, but the evaluations do not consider a variety of runtime conditions (for example, resource availability). Furthermore, database physical design advisor comparisons are based completely on query optimizer cost estimates, as opposed to actual performance measurements of the systems 100 and 600 depicted in FIGS. 1 and 6.

Figure 7:
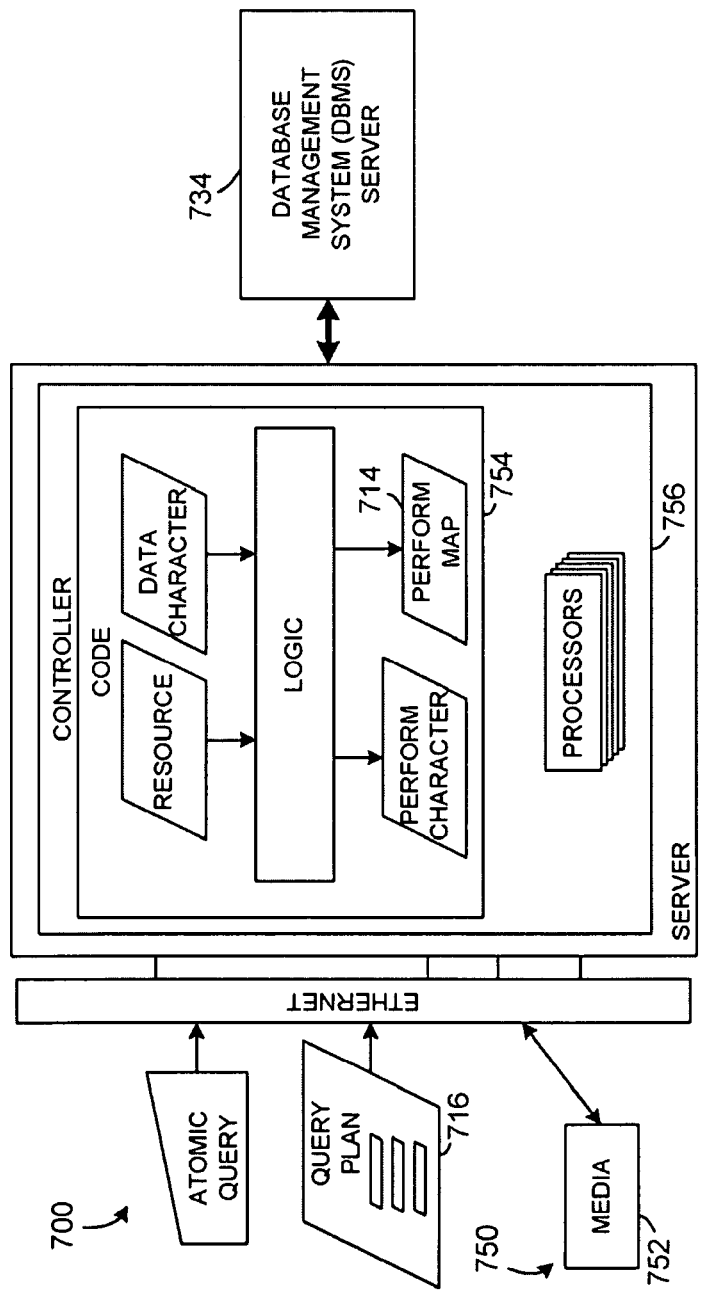
FIG. 7 is a schematic block diagram illustrating an embodiment of a computer-implemented system in the form of an article of manufacture that evaluates robustness of a given query plan by measuring performance with regard to a range of runtime conditions such as resource availability and data characteristics.

Referring to FIG. 7, a schematic block diagram illustrates an embodiment of a computer-implemented system 700 in the form of an article of manufacture 750 that evaluates robustness of a given query plan by measuring performance with regard to a range of runtime conditions such as resource availability and data characteristics. The article of manufacture 750 comprises a controller-usable medium 752 having a computer readable program code 754 embodied in a controller 756 that evaluates database performance of a selected query plan 716. The computer readable program code 754 comprises code causing the controller 756 to create a set of performance maps 714 indicating performance of a selected database system 734 following the selected query plan 716 under actual conditions. The computer readable program code 754 further comprises code causing the controller 756 to measure and map performance in a predetermined range of runtime conditions that include data characteristics.

Figure 8:
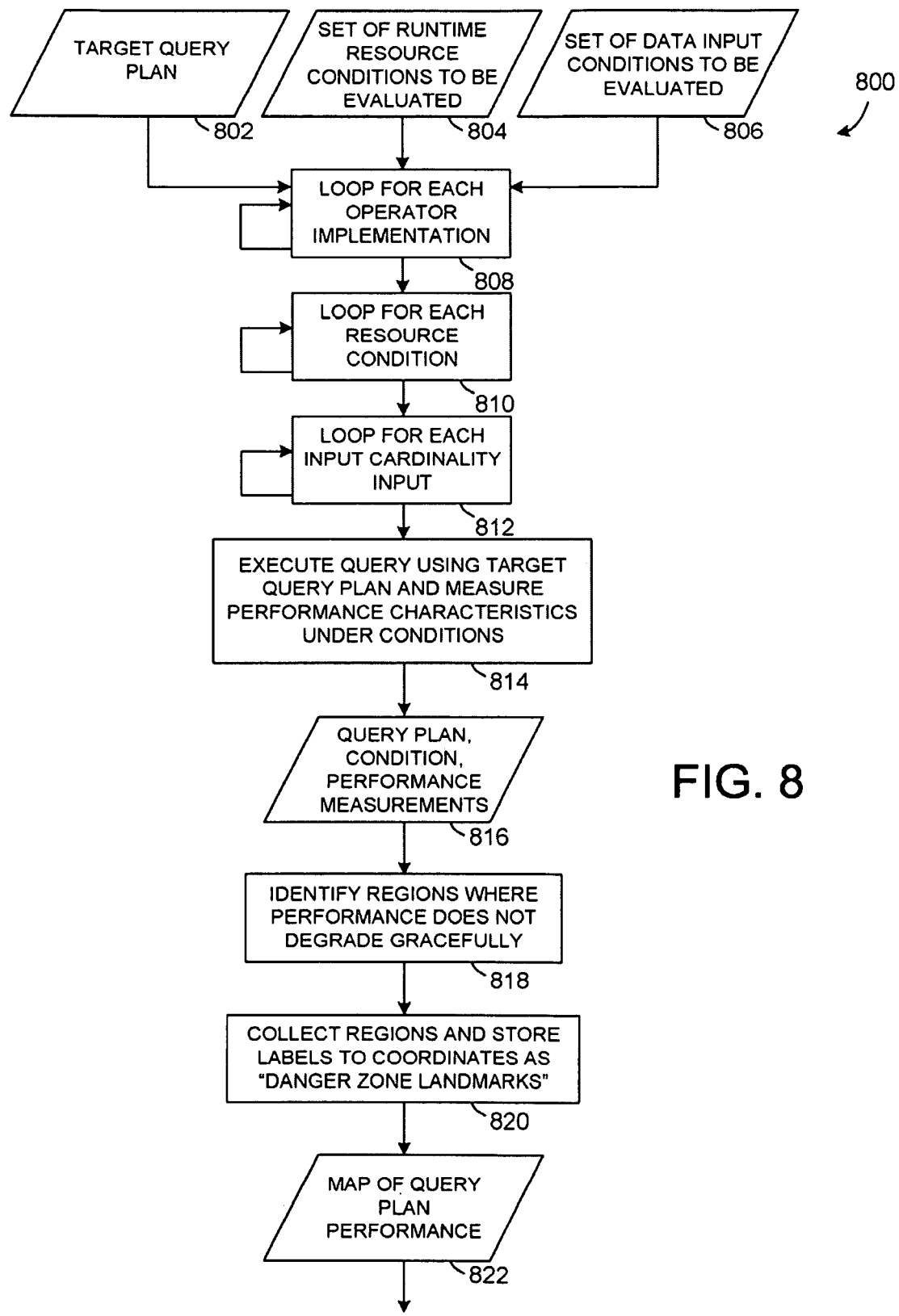
FIG. 8 is a schematic flow chart showing an embodiment of method for evaluating query plan robustness with regard to resource availability and data characteristics for a single input operator.

Referring to FIG. 8, a schematic flow chart illustrates an embodiment of method 800 for evaluating query plan robustness with regard to resource availability and data characteristics for a single input operator. The method 800 is used to create a set of one or more maps that can be used to look up the performance characteristics of a given database operator implementation under a set of both runtime and data characterization conditions. Given a target query plan 802 and a set 804 of runtime resource conditions to be evaluated (amount of memory, CPU load, and the like), in combination with a set 806 of data input conditions (number of input rows, selectivity of a select or join predicate, presence of index, etc.), the method 800 sequences through each resource condition 810 and each data input condition 812. The resource conditions can include amount of memory, CPU load, potential hardware configurations, and the like. For the data input conditions, the method 800 can sequence through for each data input cardinality increment 812. The cardinality increments can be adjusted from fine to coarse, for example according to the amount of memory available. As the method 800 sequences through the resource conditions 810 and data input conditions 812, the query can be executed 814 using the target query plan and multiple performance characteristics measured under the given conditions. The query plan, condition, and performance measurements resulting from query execution 814 are collected and stored 816. Performance characteristics can include average processing rate, elapsed time per tuple, and the like. The stored 816 information can include query plan, condition, performance measurements to create sets that can be used for multiple applications.

The stored information can be used to identify 818 regions where performance does not degrade gracefully. The regions can be identified 818 using a selected method of quantifying continuity (such as, "smoothness vs. jagginess") across a metric space (normalized linear space). For example, the Lipschitz condition/Hölder continuous functions can be used as an analysis technique. Basically, higher scores can be assigned to regions that describe gentle curves, and lower scores to regions that have steep inclines, step functions, or other dramatic "jags".

FIG. 8 illustrates an example embodiment of the steps of a methodology that creates a set of maps for a database system's performance when executing a given plan under a set of varying conditions. Each map shows the performance of a given target query plan in a given range of conditions (for example, cardinality of the input to the operator and available memory). The method 800 can include iteration over the resource conditions 810. For each resource condition step 810, the method 800 can iterate 812 over data input conditions. In other implementations or applications, the iterations can be performed in a different order. For example, instead of iterating over data input conditions per resource condition step, iterate can be performed over resource condition steps per data input condition step. For each set of resource condition/data input condition coordinates, the query can be executed 814 while forcing use of the given query plan, and the performance characteristics measured and recorded 816.

In another example embodiment, instead of executing the operator under the given conditions and collecting actual performance measurements, a cost model or an emulator can be invoked to enable determination of query plan behavior under the given conditions. In a further example embodiment, instead of using time as a measurement of performance, a multitude of performance characteristics can be used, for example including execution time, elapsed (wall clock) time, number of I/O's generated, and others.

The regions can be collected 820 and labels to the coordinates stored as "danger zone landmarks" to create 822 a map of query plan performance including coordinates of "danger zone landmarks" in terms of the operator's cardinality, resource conditions, and performance map.

Figure 9:
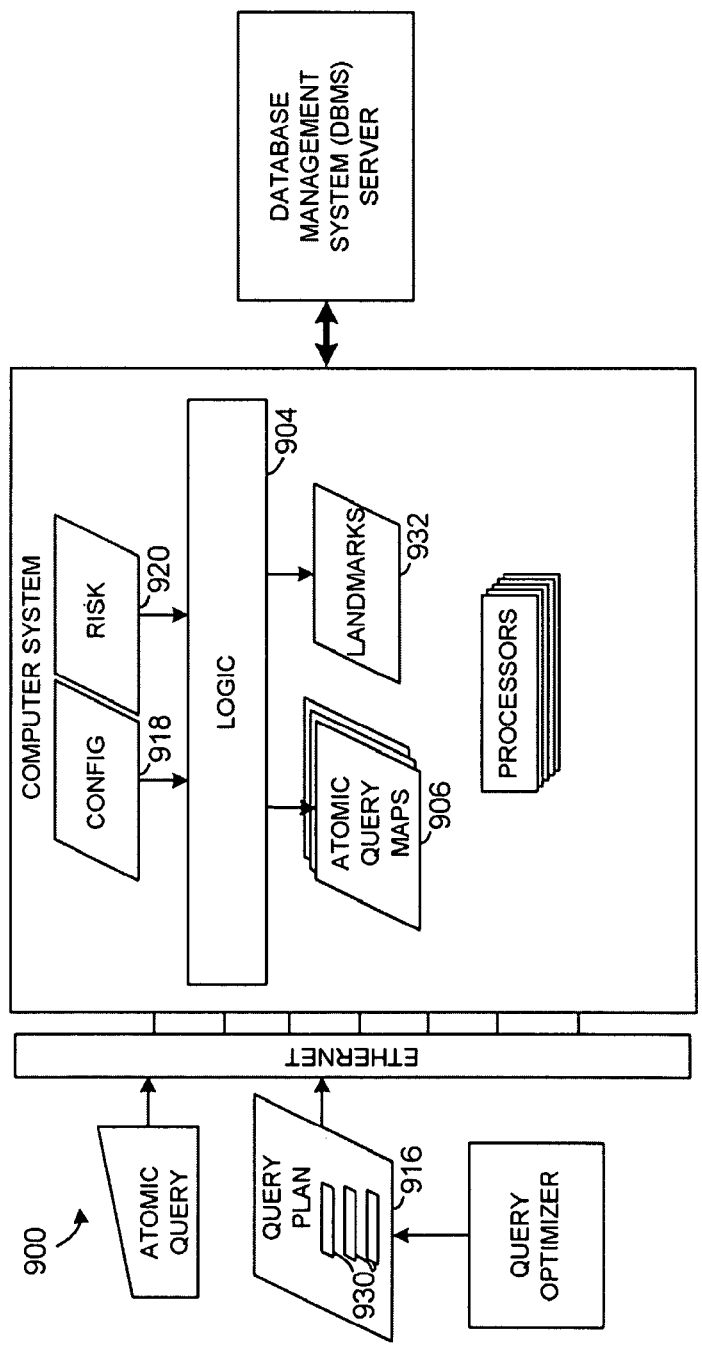
FIG. 9 is a schematic block diagram depicting an embodiment of a computer-implemented system that evaluates the robustness of a given atomic query by measuring performance with regard to a range of runtime conditions.

Referring to FIG. 9, a schematic block diagram depicts an embodiment of a computer-implemented system 900 that evaluates the robustness of a given atomic query by measuring performance with regard to a range of runtime conditions (resource availability and data characteristics). The system 900 also produces a set of measurements that can be displayed as a set of one or more maps. The system 900 also enables execution of a method for analyzing the measurements to identify landmarks, which are defined as features on the map indicating regions where performance of a given database atomic query degrades less than gracefully.

The computer-implemented system 900 comprises logic 904 that accesses a set of atomic query maps 906 indicating atomic query performance in a plurality of runtime conditions and analyzes the atomic query maps 906 to identify landmarks in relation to a selected query plan 916 wherein query performance degrades in a manner different from a predetermined manner.

An embodiment of the system 900 can further comprise a query plan 916, a set 918 of system configuration and contention information, and a set 920 of information quantifying risk of encountering error in cardinality estimation during usage of database operators. The logic 904 accesses, for atomic subgraphs 930 of the query plan 916, expected conditions from the set 918 of system configuration and contention information. The logic 904 calculates data characteristics for the expected conditions and risk.

The logic 904 can look up landmarks from the atomic query maps 906 in a range of conditions and cardinality specified in the set 918 of system configuration and contention information, and creates a landmarks set 932 comprising landmarks and probability of complying with the conditions.

Figure 10:
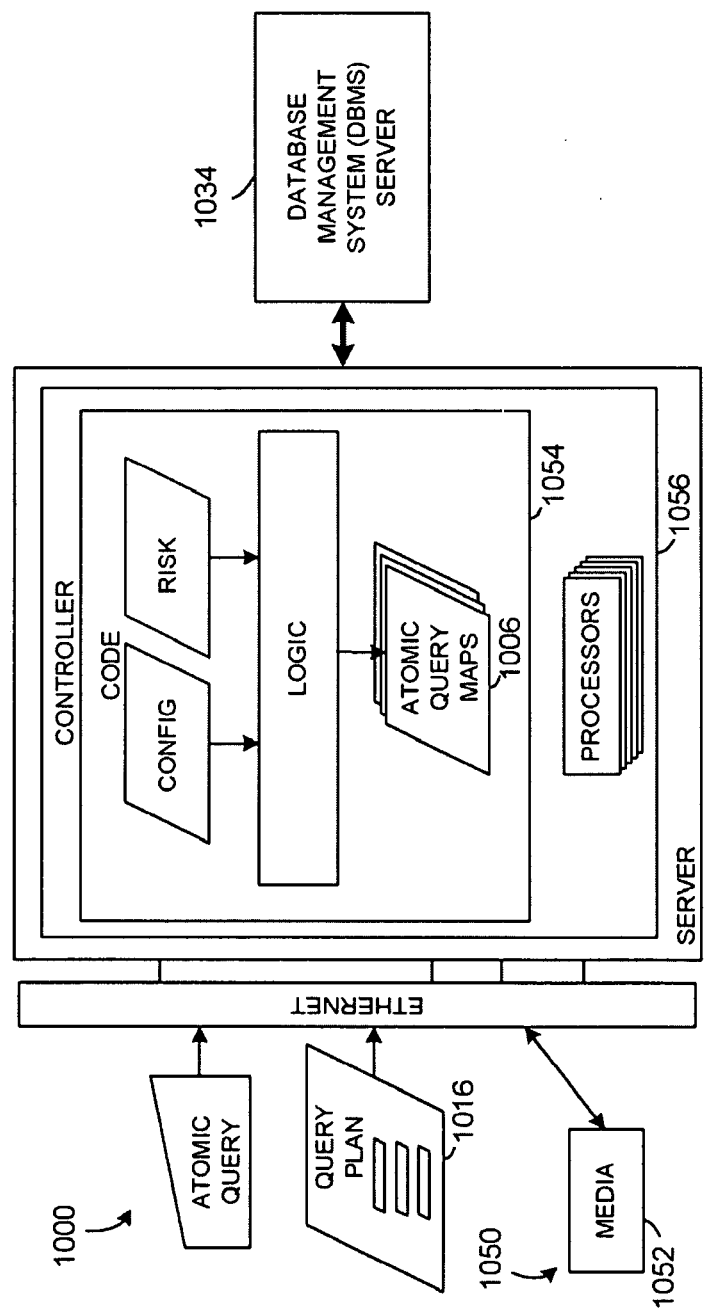
FIG. 10 is a schematic block diagram illustrating an embodiment of a computer-implemented system in the form of an article of manufacture that evaluates the robustness of a given atomic query by measuring performance with regard to a range of runtime conditions.

Referring to FIG. 10, a schematic block diagram illustrates an embodiment of a computer-implemented system 1000 in the form of an article of manufacture 1050 that evaluates the robustness of a given atomic query by measuring performance with regard to a range of runtime conditions. The article of manufacture 1050 comprises a controller-usable medium 1052 having a computer readable program code 1054 embodied in a controller 1056 that evaluates atomic query robustness. The computer readable program code 1054 comprises code causing the controller 1056 to create a set of atomic query maps 1006 indicating performance of a selected database system 1034 following the selected query plan 1016 under actual conditions. The computer readable program code 1054 further comprises code causing the controller 1056 to measure and map performance in a predetermined range of runtime conditions that include data characteristics.

Figure 11:
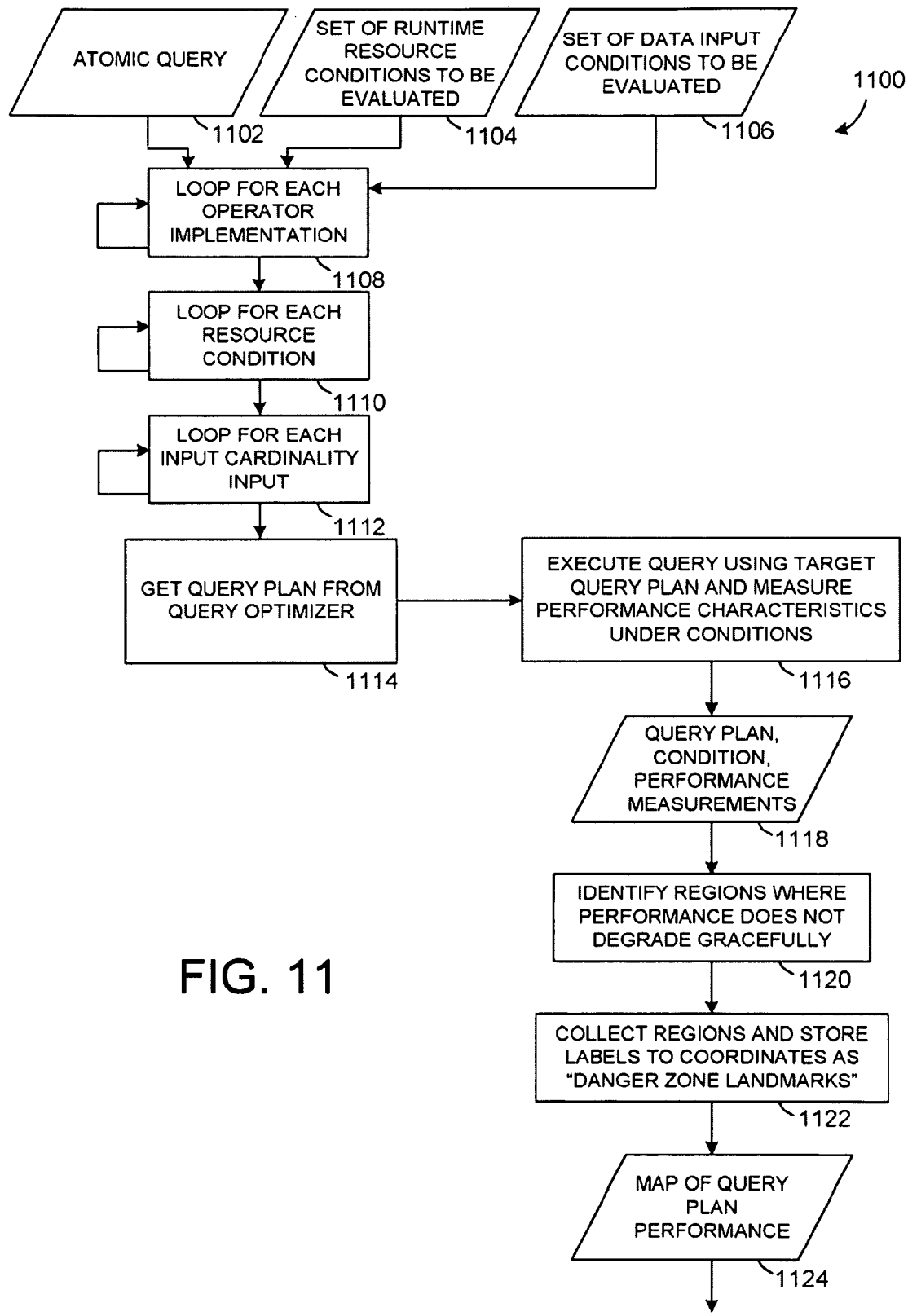
FIG. 11 is a schematic flow chart showing an embodiment of method for evaluating robustness of a given atomic query by measuring performance with regard to a range of runtime conditions.

Referring to FIG. 11, a schematic flow chart illustrates an embodiment of method 1100 for evaluating robustness of a given atomic query by measuring performance with regard to a range of runtime conditions. The method 1100 is used to create a set of one or more maps that can be used to look up the performance characteristics of an atomic query implementation under a set of both runtime and data characterization conditions. Given an atomic query 1102 and a set 1104 of runtime resource conditions to be evaluated (amount of memory, CPU load, and the like), in combination with a set 1106 of data input conditions (number of input rows, selectivity of a select or join predicate, presence of index, etc.), the method 1100 sequences through each data input condition 1112 and each resource condition 1110, for example including amount of memory, CPU load, potential hardware configurations, and others. For the data input conditions, the method 1100 can sequence through for each data input cardinality increment 1112, which can be adjusted from fine to coarse, for example according to the amount of memory available. During sequencing through the resource conditions 1110 and data input conditions 1112, a query plan can be obtained 1114 from a query optimizer and the atomic query can be executed 1116 using the target query plan and multiple performance characteristics measured under the given conditions. The query plan, condition, and performance measurements resulting from query execution 1116 are collected and stored 1118. Performance characteristics can include average processing rate, elapsed time per tuple, and the like. The stored 1118 information can include query plan, condition, performance measurements to create sets that can be used for multiple applications. The stored information can be used to identify 1120 regions where performance does not degrade gracefully. The regions can be identified 1120 using a selected method of quantifying continuity across a metric space.

FIG. 11 illustrates an example embodiment of the steps of a methodology that creates a set of maps for a database system's performance when executing an atomic query under a set of varying conditions. Each map shows the performance in a given range of conditions (for example, cardinality of the input to the operator and available memory). The method 1100 can include iteration over the resource conditions 1110. For each resource condition step 1110, the method 1100 can iterate 1112 over data input conditions. In other implementations or applications, the iterations can be performed in a different order. For example, instead of iterating over data input conditions per resource condition step, iterate can be performed over resource condition steps per data input condition step. For each set of resource condition/data input condition coordinates, the query can be executed 1116 while forcing use of the given query plan, and the performance characteristics measured and recorded 1118.

In another example embodiment, instead of executing the atomic query under the given conditions and collecting actual performance measurements, a cost model or an emulator can be invoked to enable determination of query plan behavior under the given conditions. Another example embodiment can create a map comparing relative query optimizer cost estimates to actual performance under varying conditions. In a further example embodiment, instead of using time as a measurement of performance, a multitude of performance characteristics can be used, for example including execution time, elapsed (wall clock) time, number of I/O's generated, and others.

The regions can be collected 1122 and labels to the coordinates stored as "danger zone landmarks" to create 1124 a map of query plan performance including coordinates of "danger zone landmarks" in terms of the operator's cardinality, resource conditions, and performance map.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-implemented system comprising:
a logic circuit to:
evaluate robustness of a selected atomic query by measuring performance of atomic query execution in a selected range of runtime conditions in a multi-dimensional parameter space, the multi-dimensional parameter space including at least one of data characteristics or an availability of a resource;
produce a set of measurements to be displayed in at least one performance map, the at least one performance map indicating the measured performance in the selected range of runtime conditions; and
analyze the measured performance to identify landmarks indicative of database atomic query performance degradation greater than a selected amount.

2. The system according to claim 1, wherein the logic circuit is to:
access a query plan from a query optimizer;
execute the query using the query plan to measure a plurality of performance characteristics under the runtime conditions; and
create a set comprising the query plan, the runtime conditions, and measurements.

3. The system according to claim 2, wherein the logic circuit is to:
identify regions in the at least one performance map for which performance of the query plan degrades more than a selected amount;
identify coordinates in an arrangement of the identified regions as landmarks; and
create a set of atomic query maps that include the identified regions and coordinates.

4. The system according to claim 3, wherein the logic circuit is to:
access the set of atomic query maps indicating atomic query performance in the runtime conditions, and analyze the atomic query maps to identify landmarks in relation to a selected query plan wherein query performance degrades in a manner different from a desired manner.

5. The system according to claim 3, wherein the logic circuit is to:
access, for atomic subgraphs of the query plan, expected conditions from a set of system configuration and contention information; and
calculate data characteristics for expected runtime conditions and a risk of encountering error in cardinality estimation during usage of database operators.

6. The system according to claim 5, wherein the logic circuit is to:
look up second landmarks from the atomic query maps in a second range of conditions in the multi-dimensional parameter space;
look up cardinality specified in the set of system configuration and contention information; and
create a landmarks set comprising the second landmarks and a probability of complying with the conditions.

7. A computer-implemented system comprising:
a logic circuit to:
evaluate database performance of a selected query plan;
create a set of performance maps to indicate performance of a selected database system following the selected query plan under a selected range of measured runtime conditions in a multi-dimensional parameter space, the multi-dimensional parameter space including at least one of data characteristics or an availability of a resource, at least one of the performance maps comprising a landmark indicative of database performance degradation greater than a selected amount;
measure the database performance in the selected range of runtime conditions; and
map the measured runtime conditions to the set of performance maps.

8. The system according to claim 7, wherein the logic circuit is to:
execute a query using the selected query plan;
measure a plurality of performance characteristics for selected runtime resource conditions and a plurality of data characteristics; and
create a set comprising the query plan, the conditions, and measurements.

9. The system according to claim 8, wherein the logic circuit is to:
identify regions in the performance maps for which performance of the selected query plan degrades more than a threshold amount;
identify coordinates in an arrangement of the identified regions as landmarks; and create a performance map of query plan performance that includes landmark coordinates in terms of cardinality, resource conditions, and performance of the selected query plan.

10. A computer-implemented system comprising:
a logic circuit to:
access a set of atomic query maps indicating atomic query performance in a plurality of runtime conditions in a multi-dimensional parameter space; and
analyze the atomic query maps to identify landmarks in relation to a selected query plan, wherein the landmarks are to be identified by identifying a set of runtime conditions in which performance of the selected query plan degrades in a manner different from a predetermined manner, the multi-dimensional parameter space including at least one of data characteristics or an availability of a resource.

11. The system according to claim 10, wherein the logic circuit is to:
access, for atomic subgraphs of the query plan, expected conditions from a set of system configuration and contention information; and
calculate data characteristics for expected runtime conditions and a risk of encountering error in cardinality estimation during usage of database operators.

12. The system according to claim 11, wherein the logic circuit is to:
look up second landmarks from the atomic query maps in a second range of conditions in the multi-dimensional parameter space;
look up cardinality specified in the set of system configuration and contention information; and
create a landmarks set comprising the second landmarks and a probability of complying with the conditions.

13. The system according to claim 1, wherein the runtime conditions include at least one of an amount of memory, a central processing unit load, a potential hardware configuration, an estimated cardinality, or an estimated selectivity.

14. The system according to claim 7, wherein the runtime conditions include at least one of an amount of memory, a central processing unit load, a potential hardware configuration, an estimated cardinality, or an estimated selectivity.

15. The system according to claim 10, wherein the runtime conditions include at least one of an amount of memory, a central processing unit load, a potential hardware configuration, an estimated cardinality, or an estimated selectivity.

16. The system according to claim 1, wherein the selected range of runtime conditions comprises at least two metrics.

17. The system according to claim 1, wherein each of the landmarks comprises a subset of the runtime conditions and a performance characteristic.

* * * * *